US012654686B2

(12) United States Patent
Zhang

(10) Patent No.: US 12,654,686 B2
(45) Date of Patent: Jun. 16, 2026

(54) VEHICLE CONTROL METHOD, APPARATUS, AND SYSTEM

(71) Applicant: Yinwang Intelligent Technologies Co., Ltd., Shenzhen (CN)

(72) Inventor: Jing Zhang, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 165 days.

(21) Appl. No.: 18/396,422

(22) Filed: Dec. 26, 2023

(65) Prior Publication Data

US 2024/0123974 A1 Apr. 18, 2024

Related U.S. Application Data

(63) Continuation of application No. PCT/CN2022/102109, filed on Jun. 29, 2022.

(30) Foreign Application Priority Data

Jun. 30, 2021 (CN) .......................... 202110736893.6
Nov. 23, 2021 (CN) .......................... 202111390345.9

(51) Int. Cl.
*B60W 30/06* (2006.01)

(52) U.S. Cl.
CPC ......... *B60W 30/06* (2013.01); *B60W 2520/06* (2013.01); *B60W 2520/10* (2013.01); *B60W 2552/00* (2020.02)

(58) Field of Classification Search
CPC ............. B60W 30/06; B60W 2520/06; B60W 2520/10; B60W 2552/00; G05D 2105/22;
(Continued)

(56) References Cited

U.S. PATENT DOCUMENTS 8,655,740 B2 * 2/2014 Kameyama ........ G06Q 30/0601
705/26.1
10,062,289 B2 * 8/2018 Arndt ............... G08G 1/096811
(Continued)

FOREIGN PATENT DOCUMENTS

CN 106200577 A 12/2016
CN 108711300 A 10/2018
(Continued)

OTHER PUBLICATIONS

International Search Report and Written Opinion in International Appln. No. PCT/CN2022/102109, mailed on Jul. 28, 2022, 19 pages (with English translation).
(Continued)

*Primary Examiner* — B M M Hannan
(74) *Attorney, Agent, or Firm* — Fish & Richardson P.C.

(57) ABSTRACT

This application discloses vehicle control methods, apparatuses, and systems relates to the field of autonomous driving technologies. An example method includes: determining a target vehicle, where the target vehicle is located in a first parking location; obtaining a topological relationship, where the topological relationship indicates an association relationship between multi-level parking locations, the multi-level parking locations include a first-level parking location and a second-level parking location, the first-level parking location includes the first parking location, and the second-level parking location includes at least one downstream parking location of the first parking location; allocating a second parking location to the target vehicle based on the topological relationship, where the second parking location is an idle parking location in the second-level parking location; and indicating the target vehicle to move from the first parking location to the second parking location.

30 Claims, 11 Drawing Sheets

(58) Field of Classification Search

CPC .......... G05D 2107/13; G05D 2109/10; G05D 1/225; G05D 1/2469; B62D 15/026; B62D 15/0285; G06Q 10/047; G06Q 50/40; G08G 1/096716; G08G 1/096791; G08G 1/146; G08G 1/148; G08G 1/143; H04W 4/44

See application file for complete search history.

(56) References Cited

U.S. PATENT DOCUMENTS

| | | | | |
|---|---|---|---|---|
| 10,636,305 | B1 * | 4/2020 | Schmidt | G08G 1/143 |
| 11,117,564 | B2 * | 9/2021 | Mielenz | G05D 1/0297 |
| 11,699,345 | B2 * | 7/2023 | Dudar | B60W 30/06 340/932.2 |
| 2009/0255195 | A1 * | 10/2009 | Bridgman | E04H 14/00 52/741.1 |
| 2014/0309917 | A1 * | 10/2014 | Beaurepaire | G08G 1/144 701/300 |
| 2015/0104286 | A1 * | 4/2015 | Hansl | B65G 37/00 414/800 |
| 2017/0267233 | A1 * | 9/2017 | Minster | B60W 30/06 |
| 2017/0292854 | A1 | 10/2017 | Zhang | |
| 2018/0012156 | A1 | 1/2018 | Voelz et al. | |
| 2018/0196429 | A1 * | 7/2018 | Goldberg | B62D 15/0285 |
| 2018/0211539 | A1 * | 7/2018 | Boss | G08G 1/168 |
| 2018/0361870 | A1 * | 12/2018 | Zhao | B60L 53/68 |
| 2019/0139409 | A1 * | 5/2019 | Longardner | G08G 1/144 |
| 2019/0179336 | A1 * | 6/2019 | Colijn | G05D 1/0291 |
| 2019/0308616 | A1 * | 10/2019 | Jie | B60W 50/0097 |
| 2020/0079361 | A1 * | 3/2020 | Suzuki | B62D 15/027 |
| 2020/0193827 | A1 * | 6/2020 | Refsdal | G08G 1/0133 |
| 2020/0242924 | A1 * | 7/2020 | Publicover | G08G 1/087 |
| 2020/0279196 | A1 * | 9/2020 | Karaburun | G06Q 10/02 |
| 2020/0380864 | A1 * | 12/2020 | Yan | G06V 20/40 |
| 2020/0388155 | A1 | 12/2020 | Mukaiyama | |
| 2022/0292970 | A1 * | 9/2022 | Dudar | B60W 30/06 |
| 2023/0220696 | A1 * | 7/2023 | Zangerle | E04H 6/26 414/228 |

FOREIGN PATENT DOCUMENTS

| | | | |
|---|---|---|---|
| CN | 109596138 | A | 4/2019 |
| CN | 110217120 | A | 9/2019 |
| CN | 110766966 | A | 2/2020 |
| CN | 110858073 | A | 3/2020 |
| CN | 110930757 | A | 3/2020 |
| CN | 111456516 | A | 7/2020 |
| CN | 111798693 | A | 10/2020 |
| CN | 112302387 | A | 2/2021 |
| CN | 112639912 | A | 4/2021 |
| CN | 112712725 | A | 4/2021 |
| DE | 102009057647 | A1 | 6/2011 |
| WO | 2009155780 | A1 | 12/2009 |

OTHER PUBLICATIONS

Extended European Search Report in European Appln. No. 22832077.6, mailed Sep. 24, 2024, 9 pages.

* cited by examiner

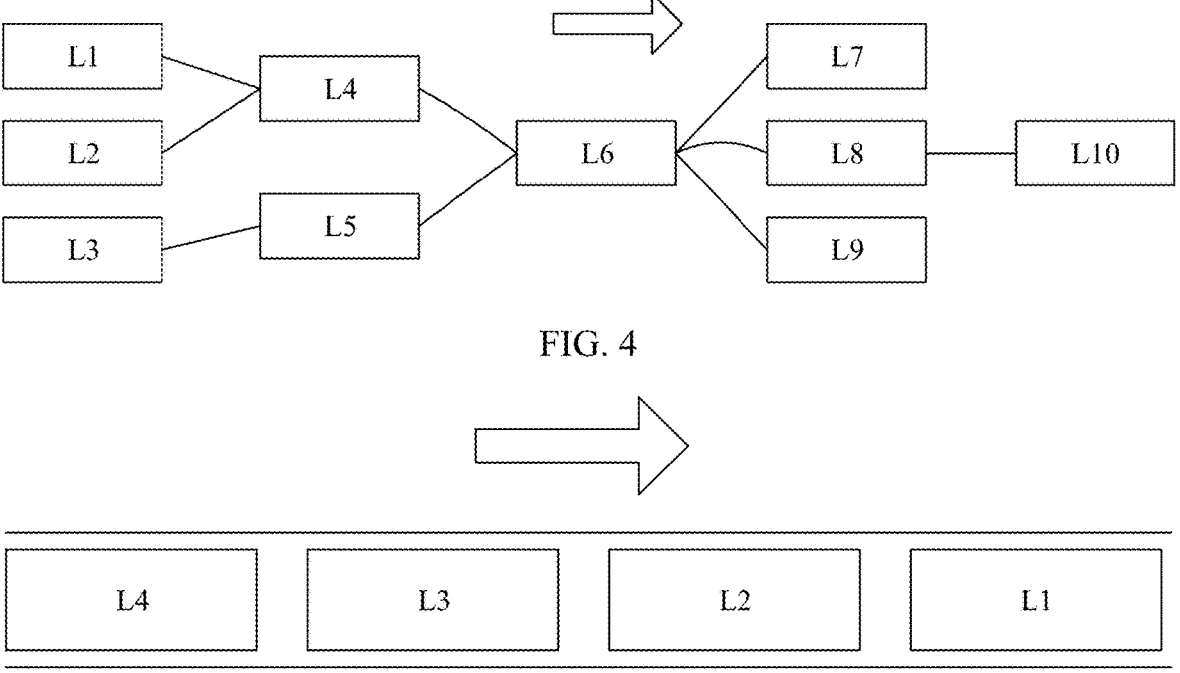
FIG. 4
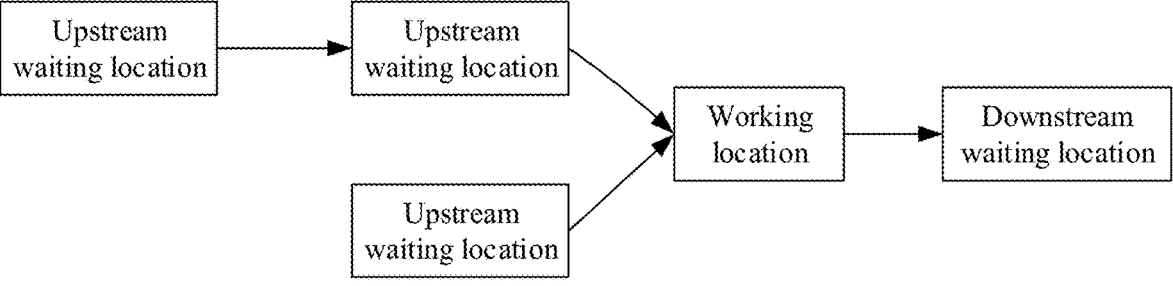
FIG. 5
Upstream waiting location → Upstream waiting location
Upstream waiting location → Working location → Downstream waiting location
Upstream waiting location →
FIG. 6

VEHICLE CONTROL METHOD, APPARATUS, AND SYSTEM

CROSS-REFERENCE TO RELATED APPLICATIONS

This application is a continuation of International Application No. PCT/CN2022/102109, filed on Jun. 29, 2022, which claims priority to Chinese Patent Application No. 202111390345.9, filed on Nov. 23, 2021 and Chinese Patent Application No. 202110736893.6, filed on Jun. 30, 2021. All of the aforementioned patent applications are hereby incorporated by reference in their entireties.

TECHNICAL FIELD

This application relates to the field of autonomous driving technologies, and in particular, to a vehicle control method, apparatus, and system.

BACKGROUND

With rapid development of technologies, vehicle autonomous driving technologies are becoming more popular. A cooperative driving control technology between a plurality of vehicles has been gradually applied to scenarios such as a port and an industrial park to replace conventional manual driving control and improve overall operation efficiency. In these scenarios, production devices are usually allocated to vehicles, so that the vehicles move to parking locations where the production devices are located, and execute corresponding operation tasks based on production resources corresponding to the production devices. Because production devices are usually fewer than vehicles, conflicts between the vehicles that compete for same resources cannot be avoided. Consequently, operation efficiency of the vehicles is greatly affected. Therefore, how to schedule vehicle resources between a plurality of vehicles is still an urgent issue that needs to be resolved.

SUMMARY

Embodiments of this application provide a vehicle control method, apparatus, and system, to perform flexible parking location resource scheduling for vehicles. This helps reduce conflicts and improve passing efficiency between the vehicles, and helps implement orderly operations or passing of the vehicles and improve overall operation efficiency.

According to a first aspect, an embodiment of this application provides a vehicle control method. The method may be applied to a vehicle control apparatus. The vehicle control apparatus may be an independent device, may be a chip or a component in a device, or may be software, and may be deployed in a cloud, a road side device, a remote server, a local server, or the like. A product form and a deployment manner of the vehicle control apparatus are not limited in this application.

The method may include: determining a target vehicle, where the target vehicle is located in a first parking location; obtaining a topological relationship, where the topological relationship indicates an association relationship between multi-level parking locations, the multi-level parking locations include a first-level parking location and a second-level parking location, the first-level parking location includes the first parking location, and the second-level parking location includes at least one downstream parking location of the first parking location; allocating a second parking location to the target vehicle based on the topological relationship, where the second parking location is an idle parking location in the second-level parking location; and indicating the target vehicle to move from the first parking location to the second parking location.

According to the foregoing method, the vehicle control apparatus may perform parking location resource management and scheduling for the target vehicle, determine, based on the first parking location in which the target vehicle is located and the topological relationship associated with the first parking location, the second parking location to which the target vehicle needs to move, and indicate the target vehicle to move. For example, the solution may be applied to a production scenario like a port, a mine, or a closed industrial park, to manage and schedule, in a unified manner, vehicles in a to-be-operated vehicle platoon in a corresponding site, to help the vehicle platoon operate in an orderly manner, resolve a problem that some vehicles wait in a queue when the vehicle platoon competes for a same production device as much as possible, and reduce congestion problems caused by disordered movement of some vehicles. This helps improve overall operation efficiency of the vehicle platoon and greatly reduce manual operation costs. The solution may also be applied to a passenger vehicle environment, for example, an expressway toll station, a garage, or a passenger station. Passing of a plurality of passenger vehicles (which are considered as belonging to one vehicle platoon) that need to queue or stop may be managed and scheduled in a unified manner, so that each passenger vehicle can perform queuing/payment, inbound, outbound, and the like in an orderly manner. This reduces long waiting time of some passenger vehicles and improves overall operation efficiency.

It should be noted that the foregoing description is merely an example description of an application scenario in this embodiment of this application, but is not any limitation. During specific implementation, the vehicle control method in this embodiment of this application may be further applied to another environment related to vehicle resource competition, and a to-be-scheduled resource may be replaced with another resource other than a parking location. For example, a road junction may be considered as a resource that needs to be allocated to a plurality of vehicles that are to pass through the road junction. The vehicle control apparatus determines whether and when the road junction may be allocated to the target vehicle, so that the plurality of vehicles can pass through the road junction in an orderly manner, to reduce congestion or queuing waiting phenomena of the vehicles at the road junction. It should be understood that, in this embodiment of this application, an example in which a vehicle is used as a target object and a parking location is used as a scheduling resource is used for description. In another possible design, another object like a robot, a manipulator, or luggage may be used as a target object, and a corresponding resource is managed and scheduled in a unified manner by using this embodiment of this application, to improve overall efficiency. Details are not described herein.

With reference to the first aspect, in a possible implementation, the first-level parking location includes a plurality of parking locations, and the target vehicle is the only vehicle in the plurality of parking locations, or a vehicle with a highest task priority, or a vehicle that first arrives in a plurality of vehicles with a same task priority.

With reference to the first aspect, in a possible implementation, the multi-level parking location includes a third-level parking location, the third-level parking location includes at least one upstream parking location of the first-level parking location, and the target vehicle is a vehicle with a highest task priority in the first-level parking location and the at least one upstream parking location of the first-level parking location, or a vehicle that first arrives in a plurality of vehicles with a same task priority, or a vehicle closest to the first-level parking location.

According to the foregoing method, the vehicle control apparatus, as a decision master control apparatus, may flexibly select, in a unified manner, a target vehicle for which parking location resource scheduling needs to be performed to schedule and manage a parking location resource, to reduce problems that may be caused by improper scheduling or planning, such as long waiting time of some vehicles and circling of some vehicles, so as to improve overall operation efficiency of a vehicle platoon. It should be understood that the manner of determining the target vehicle in this embodiment of this application is merely described herein as an example, and is not any limitation on the manner of determining the target vehicle in this embodiment of this application. In another embodiment, the vehicle control apparatus may further determine the target vehicle by using another decision factor. Details are not described herein.

In an embodiment of this application, the vehicle control apparatus may collect information in real time or periodically, and implement unified management and scheduling on different vehicles based on the obtained information.

With reference to the first aspect, in a possible design, the determining a target vehicle may include: obtaining destination information of a plurality of vehicles, where the destination information of the plurality of vehicles indicates a same destination; and determining the target vehicle from the plurality of vehicles.

According to the foregoing method, the vehicle control apparatus may determine, by obtaining and analyzing destination information of each vehicle, whether the plurality of vehicles compete for a resource. When resource competition exists, one or more vehicles for which parking location resource scheduling needs to be performed may be determined from the plurality of vehicles as the target vehicle, to allocate the second parking location to the target vehicle. This helps the plurality of vehicles that compete for the resource to perform operations in an orderly manner, and improves overall operation efficiency of the plurality of vehicles.

In addition, in this embodiment of this application, the parking location may also be a resource competed for by the plurality of vehicles. The vehicle control apparatus may further perform parking location management and scheduling for the plurality of vehicles, so that different vehicles are flexibly parked in proper parking locations, to execute corresponding operation tasks. This improves operation efficiency.

With reference to the first aspect, in a possible design, the method may further include: determining a sequence in which the plurality of vehicles arrive at the destination; and determining a parking sequence of the plurality of vehicles based on the sequence in which the plurality of vehicles arrive at the destination.

With reference to the first aspect, in a possible design, the method may further include: determining the parking sequence of the plurality of vehicles based on a travel task.

According to the foregoing method, when the vehicle control apparatus manages and schedules parking locations of the plurality of vehicles, the vehicle control apparatus may, for example, preferentially park a vehicle that needs to arrive at a destination first to a parking location that is more convenient for travel, or preferentially park, based on the travel task, a vehicle that needs to travel first to a parking location that is more convenient for travel, to facilitate a vehicle to perform a corresponding job task. This avoids as much as possible a case in which a vehicle cannot arrive at a destination in a timely manner because travel is affected due to disordered parking of the vehicle.

Optionally, because an environment like a port, an industrial park, or a parking lot has a high requirement on space utilization, to maximize economic benefits, small parking space may be divided or even no parking space may be divided. Therefore, in this embodiment of this application, a compact parking location queue for dense parking may be further designed, to obtain sufficient parking space. The compact parking location queue may have a feature of compact arrangement of front and rear parking locations, and a parking location in the parking location queue may be used for long-time parking. The vehicle control apparatus may further perform, based on a topological relationship between two adjacent parking locations in the parking location queue, parking location management and scheduling for different vehicles that need to be parked in the parking location queue, so that the different vehicles can be parked in proper parking locations, and travel of the vehicles is not affected as much as possible to perform corresponding operation tasks. If no dedicated parking lot is disposed, the parking location queue may be disposed on a lane that is not used for a long time. In addition, because the front and rear parking locations in the parking location queue are arranged in a compact manner, space utilization of a site in a target zone can be improved.

With reference to the first aspect, in a possible design, the determining the target vehicle from the plurality of vehicles includes: obtaining status information of the plurality of vehicles; and determining the target vehicle based on the status information of the plurality of vehicles. Optionally, the status information of the vehicles includes at least one of the following: a location, a speed, and a heading angle.

According to the foregoing method, the vehicle control apparatus may determine, based on the status information of the plurality of vehicles, whether the plurality of vehicles compete for a parking location resource. When the plurality of vehicles compete for the parking location resource, the vehicle control apparatus may determine the target vehicle from the plurality of vehicles. Locations of the plurality of vehicles may be used to determine a target parking location queue corresponding to the vehicle. If target parking location queues of the plurality of vehicles are the same or have an association relationship, the plurality of vehicles may need to compete for a same working location. The vehicle control apparatus needs to determine a sequence in which the vehicles arrive at the working location, and guide the plurality of vehicles to move. Alternatively, speeds of the plurality of vehicles may be used to determine time required for the vehicles to arrive at a next parking location. When scheduling references of the plurality of vehicles are the same, it may be determined, according to a first-come first-served allocation principle, that a vehicle that first arrives in the plurality of vehicles works first, and the vehicle that first arrives may be the target vehicle. Alternatively, based on heading angles of the plurality of vehicles, if a heading angle is inconsistent with a lane direction, and another vehicle is consistent with the lane direction, the vehicle may not be a vehicle that needs to compete for a same resource with the another vehicle. The target vehicle may also be determined in a case of a combination of any two or three pieces of the foregoing information: the location, the speed, and the heading angle. Details are not described herein.

With reference to the first aspect, in a possible design, the allocating a second parking location to the target vehicle based on the topological relationship includes: obtaining parking location attribute information in the topological relationship; and allocating the second parking location to the target vehicle based on the parking location attribute information.

Optionally, the parking location attribute information includes a type of a parking location and/or an availability status of the parking location. The availability status may indicate whether the parking location is idle, or whether the parking location is occupied or reserved by another vehicle, or whether the parking location needs to be preferentially allocated to another vehicle.

According to the foregoing method, the vehicle control apparatus may determine, based on the parking location attribute information predefined in the topological relationship, how to allocate the second parking location to the target vehicle, to obtain a proper parking location resource allocation result, so that a proper vehicle moves to the second parking location at a proper occasion, so that a plurality of vehicles may move and operate in an orderly manner, and overall operation efficiency of the plurality of vehicles is improved. The topological relationship may further include related attribute information of a parking location queue to which a parking location belongs. The attribute information of the parking location queue may also be considered as a type of parking location attribute information. When performing parking location resource scheduling for the target vehicle, the vehicle control apparatus may further make a scheduling decision based on the attribute information of the parking location queue, to obtain a better allocation result.

With reference to the first aspect, in a possible design, the indicating the target vehicle to move from the first parking location to the second parking location includes: when stay duration of the target vehicle in the first parking location is greater than or equal to a first threshold, indicating the target vehicle to move from the first parking location to the second parking location.

According to the foregoing method, the stay duration may be set for the parking location, to indicate a time threshold, namely, the first threshold, in which the vehicle may stay in the parking location. Further, the vehicle control apparatus may automatically control movement of the target vehicle based on the stay duration of the target vehicle in the first parking location, to reduce problems that vehicles stay for a long time due to an exception, help improve overall operation efficiency of the vehicle platoon, and greatly reduce a burden of an operator.

According to a second aspect, an embodiment of this application provides a vehicle control method. The method may be applied to an entire vehicle, a vehicle-mounted device on a vehicle, a chip in a vehicle, or another component.

The method may include: A target vehicle receives first indication information, where the target vehicle is located in a first parking location, the first parking location and a second parking location are parking locations defined in a same topological relationship, the topological relationship indicates an association relationship between multi-level parking locations, the multi-level parking locations include a first-level parking location and a second-level parking location, the first-level parking location includes the first parking location, and the second-level parking location includes at least one downstream parking location of the first parking location. The target vehicle moves from the first parking location to the second parking location based on the first indication information.

With reference to the second aspect, in a possible design, the first-level parking location includes a plurality of parking locations, and the target vehicle is the only vehicle in the plurality of parking locations, or a vehicle with a highest task priority, or a vehicle that first arrives in a plurality of vehicles with a same task priority.

With reference to the second aspect, in a possible design, the multi-level parking location includes a third-level parking location, the third-level parking location includes at least one upstream parking location of the first-level parking location, and the target vehicle is a vehicle with a highest task priority in the first-level parking location and the at least one upstream parking location of the first-level parking location.

With reference to the second aspect, in a possible design, the method further includes: The target vehicle reports destination information, where the destination information indicates a destination of the target vehicle.

With reference to the second aspect, in a possible design, the method further includes: The target vehicle reports status information, where the status information includes at least one of the following: a location, a speed, and a heading angle.

With reference to the second aspect, in a possible design, the method further includes: The target vehicle receives second indication information, where the second indication information indicates stay duration in the first parking location.

According to a third aspect, an embodiment of this application further provides a vehicle control method. The method may be applied to a vehicle control apparatus. The vehicle control apparatus may be an independent device, may be a chip or a component in a device, or may be software, and may be deployed in a cloud, a road side device, a remote server, a local server, or the like. A product form and a deployment manner of the vehicle control apparatus are not limited in this application.

The method includes: obtaining map information of a target zone, where the map information includes a plurality of pieces of parking location attribute information; and determining a running route of a target vehicle based on the plurality of pieces of parking location attribute information.

According to the foregoing method, the vehicle control apparatus may perform path planning on the target vehicle based on the plurality of pieces of parking location attribute information, to obtain the running route of the target vehicle. The solution may be applied to an autonomous-driving-based vehicle platoon. A proper planning solution is obtained by cooperatively controlling running routes of a plurality of vehicles in the vehicle platoon, so that the plurality of vehicles can operate in an orderly manner, and overall operation efficiency of the vehicle platoon is improved. It should be understood that the solution may also be applied to a vehicle platoon that includes a vehicle in a manual driving mode or a vehicle in a partially autonomous driving mode. Details are not described herein.

It should be understood that, a path planned by the vehicle control apparatus for the target vehicle may be a road-level path or a lane-level path. The road-level path may indicate that the vehicle travels on a corresponding road, mainly indicates a traveling direction at an intersection, and generally does not restrict a specific behavior of the vehicle on the road. The lane-level path may require the vehicle to travel on a specific lane, and the vehicle is not allowed to randomly overtake a vehicle, change a lane, or cross a lane. The running route of the target vehicle may include a road-level path and/or a lane-level path.

According to a fourth aspect, an embodiment of this application provides a vehicle control apparatus. The vehicle control apparatus may be an independent device, may be a chip or a component in a device, or may be software, and may be deployed in a cloud, a road side device, a remote server, a local server, or the like. A product form and a deployment manner of the vehicle control apparatus are not limited in this application.

The vehicle control apparatus may include: a determining unit, configured to determine a target vehicle, where the target vehicle is located in a first parking location; an obtaining unit, configured to obtain a topological relationship, where the topological relationship indicates an association relationship between multi-level parking locations, the multi-level parking locations include a first-level parking location and a second-level parking location, the first-level parking location includes the first parking location, and the second-level parking location includes at least one downstream parking location of the first parking location; an allocation unit, configured to allocate a second parking location to the target vehicle based on the topological relationship, where the second parking location is an idle parking location in the second-level parking location; and a communication unit, configured to indicate the target vehicle to move from the first parking location to the second parking location.

With reference to the fourth aspect, in a possible design, the first-level parking location includes a plurality of parking locations, and the target vehicle is the only vehicle in the plurality of parking locations, or a vehicle with a highest task priority, or a vehicle that first arrives in a plurality of vehicles with a same task priority.

With reference to the fourth aspect, in a possible design, the multi-level parking location includes a third-level parking location, the third-level parking location includes at least one upstream parking location of the first-level parking location, and the target vehicle is a vehicle with a highest task priority in the first-level parking location and the at least one upstream parking location of the first-level parking location.

With reference to the fourth aspect, in a possible design, the obtaining unit is configured to obtain destination information of a plurality of vehicles, where the destination information of the plurality of vehicles indicates a same destination.

The determining unit is configured to determine the target vehicle from the plurality of vehicles.

With reference to the fourth aspect, in a possible design, the determining unit is further configured to: determine a sequence in which the plurality of vehicles arrive at the destination; and determine a parking sequence of the plurality of vehicles based on the sequence in which the plurality of vehicles arrive at the destination.

With reference to the fourth aspect, in a possible design, the determining unit is further configured to determine the parking sequence of the plurality of vehicles based on a travel task.

With reference to the fourth aspect, in a possible design, the obtaining unit is configured to obtain status information of the plurality of vehicles. The determining unit is configured to determine the target vehicle based on the status information of the plurality of vehicles. Optionally, the status information of the vehicles includes at least one of the following: a location, a speed, and a heading angle.

With reference to the fourth aspect, in a possible design, the obtaining unit is configured to obtain parking location attribute information in the topological relationship. The allocation unit is configured to allocate the second parking location to the target vehicle based on the parking location attribute information. Optionally, the parking location attribute information includes a type of a parking location and/or an availability status of the parking location.

With reference to the fourth aspect, in a possible design, the communication unit is configured to: when stay duration of the target vehicle in the first parking location is greater than or equal to a first threshold, indicate the target vehicle to move from the first parking location to the second parking location.

According to a fifth aspect, this application provides a vehicle control apparatus. The vehicle control apparatus may be an entire vehicle, a vehicle-mounted device on a vehicle, a chip in a vehicle, or another component.

The method may include: A target vehicle receives first indication information. The apparatus includes: a communication unit, configured to receive the first indication information, where the target vehicle is located in a first parking location, the first parking location and a second parking location are parking locations defined in a same topological relationship, the topological relationship indicates an association relationship between multi-level parking locations, the multi-level parking locations include a first-level parking location and a second-level parking location, the first-level parking location includes the first parking location, and the second-level parking location includes at least one downstream parking location of the first parking location; and a control unit, configured to control the vehicle to move from the first parking location to the second parking location based on the first indication information.

With reference to the fifth aspect, in a possible design, the first-level parking location includes a plurality of parking locations, and the target vehicle is the only vehicle in the plurality of parking locations, or a vehicle with a highest task priority, or a vehicle that first arrives in a plurality of vehicles with a same task priority.

With reference to the fifth aspect, in a possible design, the multi-level parking location includes a third-level parking location, the third-level parking location includes at least one upstream parking location of the first-level parking location, and the target vehicle is a vehicle with a highest task priority in the first-level parking location and the at least one upstream parking location of the first-level parking location.

With reference to the fifth aspect, in a possible design, the communication unit is further configured to report destination information, where the destination information indicates a destination of the target vehicle.

With reference to the fifth aspect, in a possible design, the communication unit is further configured to report status information, where the status information includes at least one of the following: a location, a speed, and a heading angle.

With reference to the fifth aspect, in a possible design, the communication unit is further configured to receive second indication information, where the second indication information indicates stay duration in the first parking location.

According to a sixth aspect, an embodiment of this application provides a vehicle control apparatus. The vehicle control apparatus includes: an obtaining unit, configured to obtain map information of a target zone, where the map information includes a plurality of pieces of parking location attribute information; and a planning unit, configured to determine a running route of the target vehicle based on the plurality of pieces of parking location attribute information.

According to a seventh aspect, an embodiment of this application provides an apparatus. The apparatus includes a memory and a processor. The memory is configured to store computer instructions. The processor invokes the computer instructions stored in the memory, to implement the method according to any one of the foregoing aspects and the possible designs of any one of the foregoing aspects.

According to an eighth aspect, an embodiment of this application provides a computer-readable storage medium. The computer-readable storage medium stores a computer program. When the computer program is run on a computer, the computer is enabled to perform the method according to any one of the foregoing aspects and the possible designs of any one of the foregoing aspects.

According to a ninth aspect, an embodiment of this application provides a computer program product. When the computer program product runs on a computer, the computer is enabled to perform the method according to any one of the foregoing aspects and the possible designs of any one of the foregoing aspects.

According to a tenth aspect, an embodiment of this application provides a chip system. The chip system includes a processor, configured to invoke a computer program or computer instructions stored in a memory, so that the processor performs the method according to any one of the foregoing aspects and the possible designs of any one of the foregoing aspects.

With reference to the tenth aspect, in a possible implementation, the processor is coupled to the memory through an interface.

With reference to the tenth aspect, in a possible implementation, the chip system further includes a memory, and the memory stores a computer program or computer instructions.

According to an eleventh aspect, an embodiment of this application provides a processor. The processor is configured to invoke a computer program or computer instructions stored in a memory, so that the processor performs the method according to any one of the aspects and the possible designs of any one of the foregoing aspects.

According to a twelfth aspect, an embodiment of this application provides a vehicle control system. The system includes the vehicle control apparatus according to the third aspect and the fourth aspect.

In embodiments of this application, based on the implementations according to the foregoing aspects, further combination may be performed to provide more implementations.

BRIEF DESCRIPTION OF DRAWINGS

FIG. 4 is a schematic diagram of a topological relationship according to an embodiment of this application;

FIG. 5 is a schematic diagram of a parking location queue according to an embodiment of this application;

FIG. 6 is a schematic diagram of parking location resource scheduling according to an embodiment of this application;

DESCRIPTION OF EMBODIMENTS

Figure 1A:
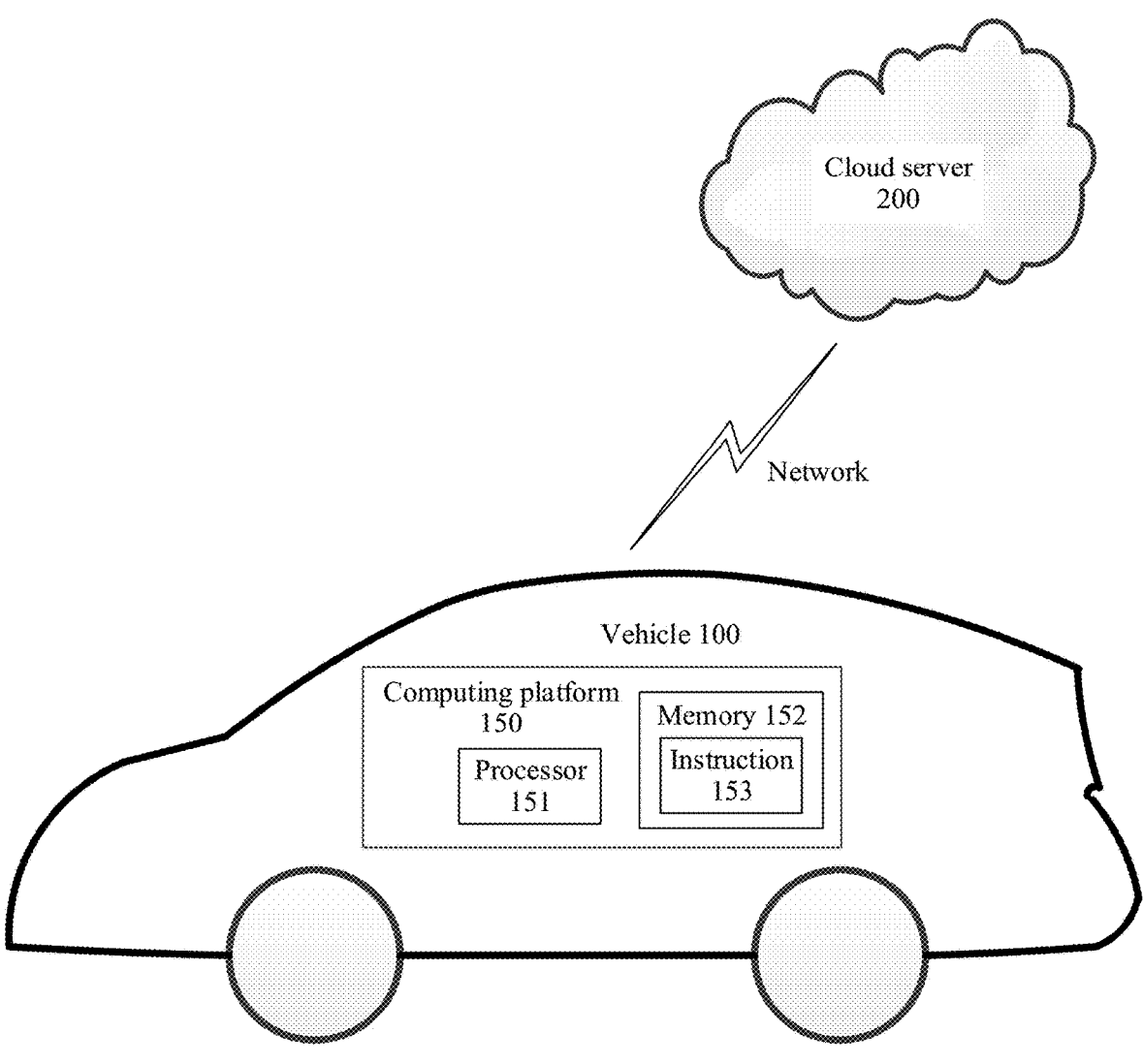
FIG. 1a is a schematic diagram of an application scenario to which an embodiment of this application is applicable.

A parking location is usually a place in which a vehicle is parked, and may be used for long-term or temporary parking. Common parking locations are classified into a parking location in a dedicated parking lot and a parking location on a road side. Some parking locations on the road side are time-sensitive. The parking locations can be used for parking at some time segments and can be used for passing at some time segments.

In a commercial vehicle production environment like a port or an industrial park, a location of a production device may be considered as a parking location, and a vehicle may move to the parking location in which the production device is located, and execute a corresponding operation task by using a production resource corresponding to the production device. Generally, a quantity of production devices is far less than a quantity of to-be-operated vehicles. In most cases, at least one vehicle needs to be allocated to a same production device, and these vehicles need to compete for a production resource corresponding to the production device. However, one production device generally serves only one vehicle at a time, and another vehicle can move to a corresponding parking location and execute an operation task only after the production device is idle and available. Long waiting time greatly affects overall operation efficiency of a vehicle platoon. Therefore, how to allocate production resources to these vehicles and time to use the production resources, so as to ensure that these vehicles can complete operations in an orderly manner is an important problem in a commercial vehicle project.

To resolve the problem, a cooperative driving solution is proposed. According to the solution, automated vehicles in a port are scheduled, planned, and guided in a unified manner based on a cloud, so that a plurality of vehicles can operate efficiently at the port. However, in this solution, the cloud is only used to deliver a task (for example, including destination information) and some basic instructions (for example, parking, task suspension, and task resumption) to the vehicle, which is a weak control mode. In this mode, the cloud does not need to have a path planning capability, or needs to have only a simple path planning capability (where, generally, presetting is required). In addition, a driving path is recorded at the vehicle by driving in a site for a plurality of times, and then a corresponding path is invoked from a vehicle database based on the task delivered by the cloud, and driving is performed along the path. In this solution, implementation of an autonomous driving function almost completely depends on the vehicle, and the cloud does not really play a role of multi-vehicle cooperative control. When route planning of some vehicles is improper, some vehicles still inevitably wait for a long time, some vehicles are circled, and some zones are congested, resulting in low operation efficiency. In addition, in this solution, a vehicle needs to record a driving path and travel along a saved driving path. This is dependent on an operation site, and the operation site cannot be flexibly changed and extended. Therefore, scalability of the solution is poor.

Embodiments of this application provide a vehicle control method, apparatus, and system. A second parking location to which a target vehicle needs to move is determined based on a first parking location in which the target vehicle is located and a topological relationship related to the first parking location by performing parking location resource management and scheduling for the target vehicle, and the target vehicle is indicated to move. The solution may be applied to a production scenario like a port, a mine, or a closed industrial park, to manage and schedule, in a unified manner, vehicles in a to-be-operated vehicle platoon in a corresponding site, to help the vehicle platoon operate in an orderly manner, resolve a problem that some vehicles wait in a queue when the vehicle platoon competes for a same production device as much as possible, and reduce congestion problems caused by disordered movement of some vehicles. This helps improve overall operation efficiency of the vehicle platoon and greatly reduce manual operation costs. The solution may also be applied to a passenger vehicle environment, for example, an expressway toll station, a garage, or a passenger station. Passing of a plurality of passenger vehicles (which are considered as belonging to one vehicle platoon) that need to queue or stop may be managed and scheduled in a unified manner, so that each passenger vehicle can perform queuing/payment, inbound, outbound, and the like in an orderly manner. This reduces long waiting time of some passenger vehicles and improves overall management and control efficiency of the plurality of passenger vehicles. The method and the apparatus are conceived based on a same technical concept. The method and the apparatus have similar principles for resolving problems. Therefore, for implementations of the apparatus and the method, refer to each other. Details are not repeatedly described.

It should be noted that the vehicle control solution in an embodiment of this application may be applied to the Internet of vehicles, for example, vehicle to everything (vehicle to everything, V2X), long term evolution-vehicle (long term evolution-vehicle, LTE-V), and vehicle to vehicle (vehicle to vehicle, V2V). For example, the vehicle control solution may be applied to a vehicle having a driving movement function, or another apparatus having a driving movement function in a vehicle. The another apparatus includes but is not limited to another sensor like a vehicle-mounted terminal, a vehicle-mounted controller, a vehicle-mounted module, a vehicle-mounted assembly, a vehicle-mounted component, a vehicle-mounted chip, a vehicle-mounted unit, a vehicle-mounted radar, or a vehicle-mounted camera. The vehicle may implement the vehicle control method provided in this application by using the vehicle-mounted terminal, the vehicle-mounted controller, the vehicle-mounted module, the vehicle-mounted assembly, the vehicle-mounted component, the vehicle-mounted chip, the vehicle-mounted unit, the vehicle-mounted radar, or the vehicle-mounted camera. Certainly, the control solution in this embodiment of this application may be further applied to another intelligent terminal that has a movement control function other than a vehicle, or disposed in another intelligent terminal that has a movement control function other than a vehicle, or disposed in a component of the intelligent terminal. The intelligent terminal may be an intelligent transportation device, a smart home device, a robot, or the like. For example, the intelligent terminal includes but is not limited to an intelligent terminal or another sensor like a controller, a chip, a radar, or a camera in an intelligent terminal, and another component.

It should be noted that, in embodiments of this application, "at least one" means one or more, and "a plurality of" means two or more. The term "and/or" describes an association relationship between associated objects, and indicates that three relationships may exist. For example, A and/or B may indicate the following three cases: A exists alone, both A and B exist, and B exists alone, where A and B may be singular or plural. The character "/" generally indicates an "or" relationship between associated objects. "At least one of the following items (pieces)" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

In addition, unless otherwise specified, ordinal numbers such as "first" and "second" mentioned in embodiments of this application are used to distinguish between a plurality of objects, but are not used to limit priorities, or importance of the plurality of objects. For example, a first parking location, a second parking location, and a third parking location are merely used to distinguish between different parking locations, but do not indicate different priorities, importance, or the like of the three parking locations.

For ease of understanding, the following provides descriptions with reference to the accompanying drawings and embodiments.

FIG. 1a is a schematic diagram of an application scenario to which an embodiment of this application is applicable. In this application scenario, a vehicle 100 and a cloud server 200 may be included, and the vehicle 100 and the cloud server 200 may communicate with each other through a network.

Some or all functions of the vehicle 100 are controlled by a computing platform 150. The computing platform 150 may include at least one processor 151, and the processor 151 may execute instructions 153 stored in a computer-readable medium like a memory 152. In some embodiments, the computing platform 150 may alternatively be a plurality of computing devices that control individual components or subsystems of the vehicle 100 in a distributed manner. The processor 151 may be any conventional processor, like a central processing unit (central processing unit, CPU). Alternatively, the processor 151 may further include a graphics processing unit (graphics processing unit, GPU), a field programmable gate array (field programmable gate array, FPGA), a system on chip (system on chip, SOC), an application-specific integrated chip (application-specific integrated circuit, ASIC), or a combination thereof.

In addition to the instructions 153, the memory 152 may further store data, such as a road map, route information, and a location, a direction, a speed, and other such vehicle data of the vehicle, and other information. This information may be used by the vehicle 100 and the computing platform 150 during an operation of the vehicle 100 in autonomous, semi-autonomous, and/or manual modes.

It should be understood that a structure of the vehicle in FIG. 1a should not be understood as a limitation on embodiments of this application.

Optionally, the vehicle 100 may be a car, a truck, a motorcycle, a bus, a boat, an airplane, a helicopter, a lawn mower, a recreational vehicle, a playground vehicle, a construction device, a trolley, a golf cart, a train, or the like. This is not specifically limited in embodiments of this application.

In addition, a cloud server may be further included in the application scenario shown in FIG. 1a. In this embodiment of this application, the cloud server may carry, to path information delivered to a vehicle, information about a road and planning time information when the vehicle travels on the road. The server delivers the planning time information, so that a total quantity of vehicles on each segment of the road is less than or equal to a capacity of each segment of the road when the vehicle travels on each segment of the road, to avoid road congestion caused when a total quantity of vehicles is greater than a capacity of the road as much as possible, and help avoid conflicts between vehicles.

In an embodiment, the cloud server 200 may alternatively be implemented by using a virtual machine.

Figure 1B:
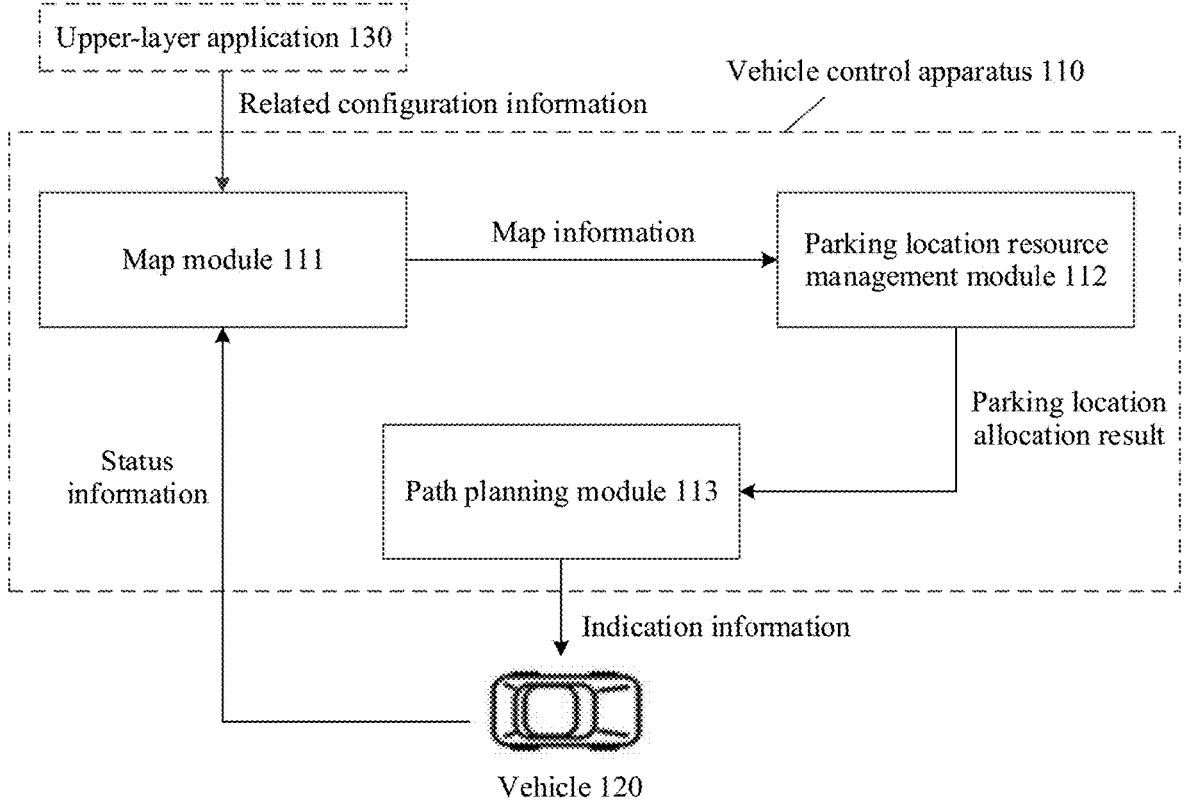
FIG. 1b is an architectural diagram of a system to which an embodiment of this application is applicable.

FIG. 1b is an architectural diagram of a system to which an embodiment of this application is applicable. Refer to FIG. 1b. The system may include a vehicle control apparatus 110 and a vehicle 120. It should be understood that only an example of an apparatus that may be included in the system is described herein instead of any limitation. Optionally, the system may further include an upper-layer application 130, a road side unit (road side unit, RSU), and the like. In addition, quantities of various apparatuses that may be included in the system are not limited to one. For example, the system may include at least one vehicle 120.

The vehicle control apparatus 110 may be configured to provide a related service/function for controlling the vehicle 120, including but not limited to a map service, a parking location resource management service, a path planning service, and the like. In a possible implementation, the foregoing services may also be implemented by a corresponding module in the vehicle control apparatus 110. For example, a map module 111 provides the map service, a parking location resource management module 112 provides the parking location resource management service, and a path planning module 113 provides the path planning service. It should be understood that the map module 111, the parking location resource management module 112, and the path planning module 113 described herein may be different modules, or may be two modules, or may be one module, or some module functions may be deployed in an upper-layer application or another system. This embodiment of this application imposes no limitation on services provided by the vehicle control apparatus 110 and specific implementations of the services.

For example, that the map module 111 provides the map service may be providing map information required for performing driving control on the vehicle 120 in a specified target zone, including but not limited to road information, parking location information, other related information, and the like in the target zone. That the parking location resource management module 112 provides the parking location resource management service may be performing parking location resource scheduling for the vehicle 120. By allocating a proper parking location to the vehicle 120, the vehicle 120 can move in an orderly manner in a target zone and complete an operation task. That the path planning module 113 provides the path planning service may be performing path planning for the vehicle, planning a running route of the vehicle in the target zone, and sending indication information to the vehicle, so that the vehicle 120 can move in an orderly manner based on an obtained path. Thus, under cooperative control of the modules, the vehicle control apparatus may flexibly perform parking location resource scheduling for a plurality of vehicles when the plurality of vehicles compete for a resource, to reduce a long-time waiting problem, a congestion problem, and the like of some vehicles, and improve overall operation efficiency of the plurality of vehicles as much as possible.

The modules in the vehicle control apparatus 110 may communicate with each other and transmit information to each other, to ensure implementation of related functions of the vehicle control apparatus. For example, the parking location resource management module 112 may query vehicle information, parking location information, and other related configuration information in the target zone from the map module, and allocate, based on the queried vehicle information, parking location information, and other related information in the target zone, a parking location to a target vehicle for which parking location resource scheduling needs to be performed, to obtain a parking location resource allocation result. The path planning module 113 may query the parking location resource allocation result of the target vehicle from the parking location resource management module 112, and perform path planning for the target vehicle based on the parking location resource allocation result, to obtain a to-be-run path of the target vehicle. It should be noted that, in FIG. 1b, a connection line between the map module 111, the parking location resource management module 112, and the path planning module 113 only indicates that information is exchanged between these modules, and does not limit a communication mode, an information transmission direction, and specific information transmitted between different modules.

During specific implementation, the vehicle control apparatus 110 may be presented in a plurality of different product forms. For example, the vehicle control apparatus may be a server. The server may be a single server, or may be a server cluster including a plurality of servers. The server may be a local server. In the Internet of vehicles field, the server may be specifically a cloud server, or may be referred to as a cloud, a cloud controller, an Internet of vehicles server, or the like. The cloud server is a general term for devices or components having a data processing capability, for example, may include a physical device like a host or a processor, may include a virtual device like a virtual machine or a container, or may include a chip or an integrated circuit. Optionally, the vehicle control apparatus 110 may be a road side device, or a chip or a component in a road side device.

The vehicle 120 may be any vehicle, including but not limited to a production vehicle, a vehicle of a common work type, a vehicle of a special work type, and the like, and may be a passenger vehicle, a truck, or the like. The vehicle 120 may be registered with the vehicle control apparatus 110, so as to obtain the foregoing services provided by the vehicle control apparatus 110. The services provided by the vehicle control apparatus 110 for the vehicle 120 may be presented on the vehicle 120 in a plurality of forms. For example, the service may be a voice service, a navigation service, an autonomous driving service, a query service, or a voice broadcast service. This is not limited in embodiments of this application. The vehicle 120 may further report related information, for example, status information of the vehicle, to the vehicle control apparatus 110, so that the vehicle control apparatus 110 can perform unified management and scheduling on a plurality of vehicles based on the status information reported by the vehicle 120.

The vehicle 120 may be a vehicle in a fully manual driving mode, or a vehicle in a fully autonomous driving mode, or the vehicle 120 may be a vehicle configured to be in a partially autonomous driving mode. That the vehicle is in the partially autonomous driving mode, for example, means that the vehicle 120 may control the vehicle 120 when in the autonomous driving mode, and may determine current states of the vehicle and an ambient environment by using a manual operation, determine a possible behavior of at least one other vehicle in the ambient environment, and control the vehicle 120 based on determined information. When the vehicle 120 is in the fully autonomous driving mode, the vehicle 120 may be set to operate without interacting with a person. It should be understood that when the foregoing system includes at least one vehicle, the at least one vehicle may include vehicles of different vehicle types, vehicles of different operation types, vehicles of different task priorities, or vehicles in different driving modes. In other words, the system may specifically include a plurality of different vehicles. This is not limited in embodiments of this application.

Optionally, a vehicle-mounted device configured to perform information processing and information exchange, for example, a vehicle-mounted telematics box (telematics box, T-Box), may be further placed or installed on the vehicle 120, and the T-Box may communicate with an RSU. Alternatively, if various terminal devices are located on a vehicle (for example, placed in the vehicle or installed in the vehicle), the terminal devices may be considered as vehicle-mounted devices, and the vehicle-mounted devices may also be considered as on board units (on board units, OBUs).

Optionally, the vehicle control apparatus 110 may be upward connected to the upper-layer application 130. For example, the upper-layer application may be an application or software. The upper-layer application 130 may be installed and run on user equipment (which may be a cloud device or a terminal device). An operator may configure the vehicle control apparatus 110 by using the upper-layer application 130, including but not limited to configuring a function of the vehicle control apparatus 110, delivering a task, delivering a control instruction, and the like. Further, the vehicle control apparatus 110 may perform unified parking location resource scheduling for a related vehicle in the system based on configuration information, a task, control instructions, and the like that are obtained from the upper-layer application 130, and by using other information that can be obtained by the vehicle control apparatus 110, to improve overall operation efficiency of the vehicle.

It may be understood that the user equipment may be any suitable electronic device, including but not limited to a mobile phone, a tablet computer, a desktop computer, a wearable device, or the like. The user equipment may have a user interface (user interface, UI), and may be configured to display the map information and the parking location information in the target zone, a vehicle in a map, and the like. The user interface may be a touchscreen, and the operator may implement the foregoing related configuration by performing a touch operation on the user interface. Alternatively, the user equipment may further have another input apparatus, like a mouse or a keyboard. By using these input apparatuses, the operator may perform configuration, task delivery, and the like on the vehicle control apparatus by using the upper-layer application.

Based on the system architecture shown in FIG. 1b and the vehicle control method in this application, the vehicle control apparatus 110 may perform parking location resource management and scheduling for the vehicle 120, so that the vehicle 120 and a vehicle platoon to which the vehicle 120 belongs can operate in an orderly manner, to improve overall operation efficiency of the vehicle platoon. For ease of understanding, the following describes in detail specific implementation of the vehicle control method in embodiments of this application with reference to the method flowchart.

Figures 2, 3:
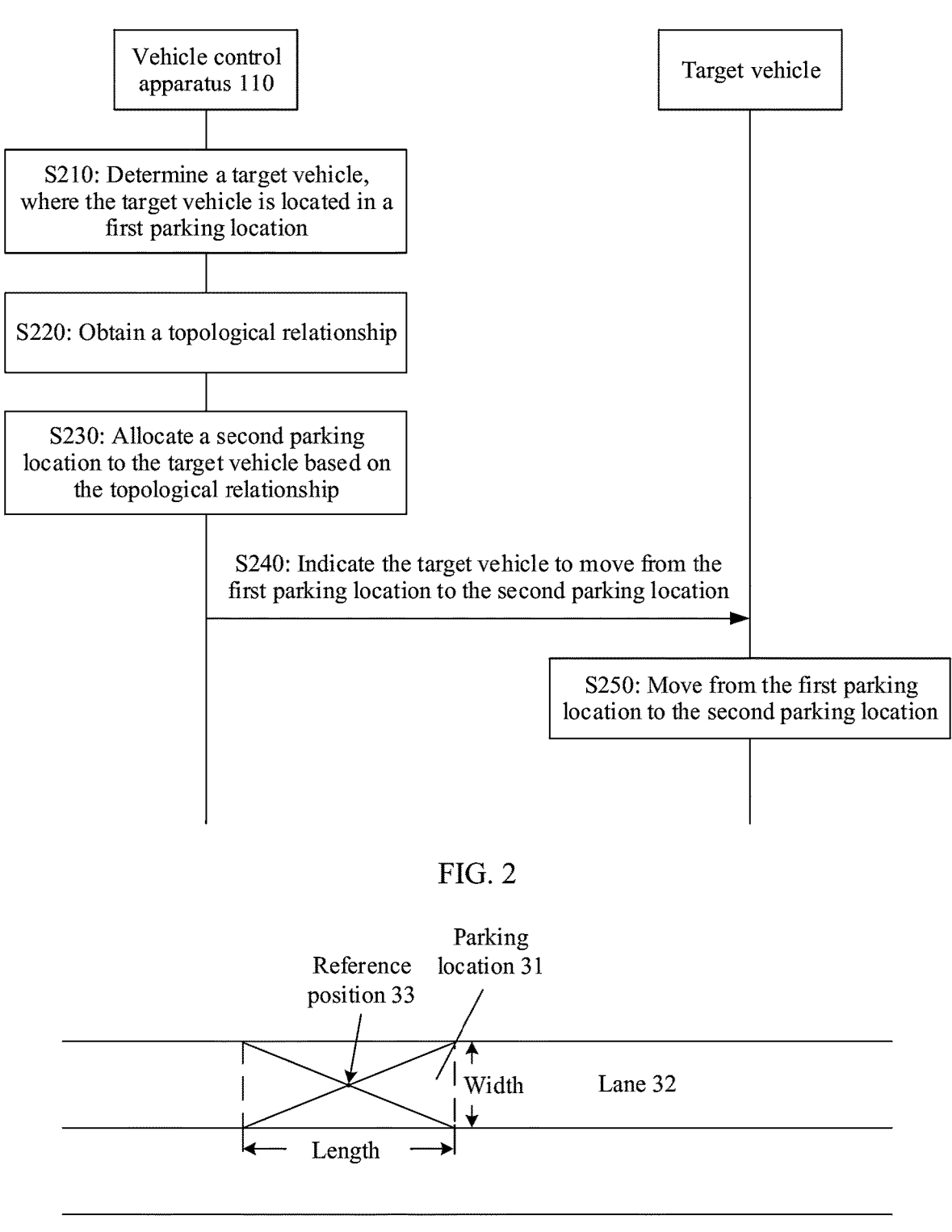
FIG. 2 is a schematic flowchart of a vehicle control method according to an embodiment of this application.
FIG. 3 is a schematic diagram of a parking location according to an embodiment of this application.

FIG. 2 shows a flowchart of a vehicle control method according to an embodiment of this application. The method may be cooperatively implemented by the vehicle control apparatus 110 shown in FIG. 1b and a target vehicle. The target vehicle may be the vehicle 120 in FIG. 1b. When at least one vehicle 120 is included in FIG. 1b, the target vehicle is a vehicle in the at least one vehicle 120. It may be understood that the cloud server shown in FIG. 1a may replace the vehicle control apparatus 110 in FIG. 1b, and the vehicle shown in FIG. 1a may also replace the vehicle in FIG. 1b, to implement the following vehicle control method.

Refer to FIG. 2. The vehicle control method may include the following steps.

S210: The vehicle control apparatus 110 determines a target vehicle, where the target vehicle is located in a first parking location.

In this embodiment of this application, the target vehicle is a vehicle for which parking location resource scheduling needs to be performed.

Generally, in a commercial vehicle production environment, a production device and a production material corresponding to the production device are usually production resources that need to be competed for by a plurality of vehicles. Each vehicle needs to travel to a parking location in which a same production device is located, and execute a corresponding operation task by using a production material corresponding to the production device. Therefore, the parking location in which the production device is located may also be considered as a resource that needs to be competed for by the plurality of vehicles. In a passenger vehicle environment, a plurality of vehicles may also compete for a same parking location, for example, a gate of a toll station or an entrance and an exit of a parking lot. In this embodiment of this application, vehicles for which parking location resource scheduling needs to be performed is vehicles that need to compete for a same parking location resource, and the target vehicle may be a vehicle in the plurality of vehicles.

In an example, the vehicle control apparatus 110 may obtain destination information of the plurality of vehicles, and destination information of any vehicle may indicate a destination of the vehicle. The vehicle control apparatus 110 may parse the destination information of the plurality of vehicles. When determining that the destination information of the plurality of vehicles indicates a same destination, the vehicle control apparatus 110 may determine that the plurality of vehicles are the vehicles for which parking location resource scheduling needs to be performed. Further, the vehicle control apparatus 110 may determine the target vehicle from the plurality of vehicles.

It should be noted that, during specific implementation, the vehicle control apparatus 110 may obtain the destination information of the vehicle in a plurality of manners. This is not limited in embodiments of this application. For example, the vehicle control apparatus 110 may receive a task from the upper-layer application 130, and the task may include the destination information of the plurality of vehicles. Alternatively, the vehicle control apparatus 110 may receive the destination information reported by each of the plurality of vehicles. Alternatively, the vehicle control apparatus 110 may receive a task from the upper-layer application 130, where the task may include the destination information of some of the plurality of vehicles, and receive the destination information reported by other vehicles of the plurality of vehicles. The vehicle may directly communicate with the vehicle control apparatus 110, to report the destination information of the vehicle to the vehicle control apparatus 110. Alternatively, the vehicle may communicate with the vehicle control apparatus 110 by using a third-party device (for example, an RSU), to report the destination information of the vehicle to the vehicle control apparatus 110. An implementation is not limited in embodiments of this application.

It should be understood that the foregoing manner of determining the target vehicle based on the destination information is merely an example rather than any limitation of this application. In another embodiment, the vehicle control apparatus 110 may alternatively determine the target vehicle in another manner, for example, based on a topological relationship. In the following, another manner of determining the target vehicle in this application is further described with reference to the topological relationship. Details are not described herein.

The first parking location may be a first location of the target vehicle. Because a vehicle usually has a predetermined volume and needs to occupy predetermined space, the parking location (location) described in this application may specifically be a reference position for the vehicle when the vehicle stays in corresponding space. The reference position may be represented by a geometric center of space occupied by the vehicle in a two-dimensional plane zone. Refer to FIG. 3. A parking location 31 is a resource on a road network, and may be located on a lane 32. A rectangular frame is used to represent the parking location 31. A width of the parking location 31 is approximately consistent with a width of a lane in which the parking location 31 is located. A length of the parking location 31 is greater than or equal to a length of a vehicle, or may be less than a length of the vehicle. A reference position 33 of the parking location 31 is generally a geometric center of the parking location 31, and the vehicle may move to the parking location 31 and stay.

It should be noted that, in this embodiment of this application, a parking location may have different definitions in different application scenarios. For example, the parking location may be a parking location that actually exists in the physical world, for example, a parking location in a parking lot or a road side parking location, and may be a parking location that can be collected by using a high-precision map. Alternatively, the parking location may be a parking location on a lane in a commercial vehicle production environment. The parking location is generally not marked in the physical world, and the information may not be obtained on a high-precision map. It may be understood that, in addition to a parking location that actually exists in the physical world, the parking location in this embodiment of this application may be a parking location that is not marked in the physical world, namely, a virtual parking location. A location and a range of the virtual parking location may be dynamically generated based on a requirement of an operation, and may be presented on a human-computer interaction interface. In the commercial vehicle production environment, parking location settings may be related to production operations, and locations of parking locations may also vary with operation requirements. A change frequency may be high or low, and different parking locations may also overlap with each other. When the operation requirements change dynamically, a quantity of existing parking locations does not meet the requirements. In this case, a capacity of parking locations needs to be expanded, that is, virtual parking locations are added. The added virtual parking locations may be added based on an original topological relationship. For example, as shown in FIG. 5, when vehicles are queuing for an operation, parking location queues for an existing operation requirement are L1, L2, and L3, where L1 is a downstream parking location of L2, and L2 is a downstream parking location of L3. After an operation requirement dynamically changes, more vehicles are dispatched to a same operation parking location. Therefore, a temporary waiting parking location L4 needs to be added to meet a queuing operation requirement. The added L4 parking location may be an upstream parking location of L3, or may be a parallel parking location of L3. This is not limited in embodiments of this application. When the operation requirement changes dynamically, the quantity of existing parking locations is greater than a quantity of parking locations required by an actual operation requirement. In this case, parking locations may be deleted based on a task requirement to release space. When there is a new operation requirement, the deleted parking locations may be used as parking locations for the new operation requirement. For example, a parking location queue for an existing operation requirement is L1, L2, and L3, where L3 is an upstream parking location of L2, and L2 is an upstream parking location of L1. When parking locations required by an actual operation requirement decreases, any one of L1, L2, and L3 may be deleted, and the deleted L1, L2, or L3 parking location may be used as a parking location required for a new task without affecting the existing operation requirement.

Figure 15:
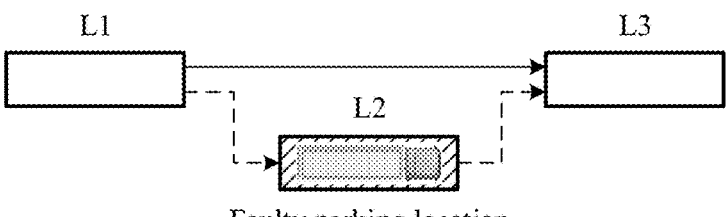
FIG. 15 is a schematic diagram of a parking location queue according to an embodiment of this application.

It may be understood that a parking location may be expanded or deleted based on an operation requirement. In addition, when a vehicle is faulty, a parking location where the faulty vehicle is located is closed, or when there is a higher-priority operation requirement, a parking location for an existing operation requirement is temporarily requisitioned, so as to ensure the execution of the higher-priority operation requirement. In the foregoing case, a topological relationship between the parking location and another parking location may be updated. The following uses an example in which a vehicle is faulty in an operation process for description. For example, as shown in FIG. 15, a parking location queue for an existing operation requirement is L1, L2, and L3, where L1 is an upstream parking location of L2, and L2 is an upstream parking location of L3. After a vehicle parked on L2 is determined as a faulty vehicle, a parking location of L2 is a faulty parking location, that is, before the faulty vehicle recovers or the faulty vehicle is removed, the parking location will be occupied by the faulty vehicle for a long time and cannot meet an original operation requirement. Therefore, a status of L2 needs to be set to be closed or marked as a faulty parking location, and L2 needs to be removed from the parking location queue. In this case, two different implementations are included. One possible implementation is to delete L2, and add a parking location (for example, an upstream parking location and a downstream parking location of L2) related to L2 in a topological relationship to another topological relationship. Alternatively, an original topological relationship is disconnected at L2, and a new topological relationship is formed at the upstream parking location and the downstream parking location of L2. To be specific, if L2 has both the upstream parking location and the downstream parking location, the parking location in which L2 is originally located is split into two new topological relationships (or referred to as queues). Another possible implementation is to delete a topological relationship related to L2, and the original queue is still a complete queue. In other words, after L2 is removed, the upstream parking location L1 and the downstream parking location L3 of L2 form a new upstream/downstream relationship. In this case, there is no middle L2 parking location, L3 and L1 form a queue, and L3 is an upstream parking location of the L1 parking location. The foregoing content describes an embodiment in which a faulty vehicle is parked in a parking location. When the faulty vehicle is not parked in the parking location, a parking location may be generated based on a location of the faulty vehicle, and a status of the parking location is set to be closed or the parking location is marked as a faulty parking location. In subsequent vehicle path planning, the parking location is avoided.

In this embodiment of this application, when the parking location is closed, and is removed from a topological relationship, the following example operation may be performed: A system operator selects a parking location that needs to be removed, or a cooperative driving system prompts an operator to confirm removal of the faulty parking location after detecting the faulty parking location, or a cooperative driving system directly removes the faulty parking location after detecting the faulty parking location. This is not limited in embodiments of this application. Further, the cooperative driving system determines whether the parking location will damage an original parking location queue, and displays, on the interface, a queue result obtained after the parking location and a related topology structure are removed. The system operator performs an operation based on the displayed result, or the system directly performs an operation after determining whether a new topological relationship is feasible. For example, when the faulty parking location is located at the downstreammost or upstreammost of the queue, removing the faulty parking location does not affect an original queue topological relationship. When the faulty parking location is located in the middle of the queue, the faulty parking location has both an upstream parking location and a downstream parking location. In this case, the original parking location queue may be divided into two new queues based on an actual connection status of an operation parking location, or integrity of the original queue may be retained. Operation efficiency may be used as a basis for dividing the parking location queue. The topological relationship of the parking location includes a chain structure and a mesh structure. For example, when a faulty parking location exists in the chain structure, a new topological relationship is established to enable a vehicle to operate normally. When a faulty parking location exists in the mesh structure, there is a case in which the parking location is closed without adjusting the original parking location queue, and an operation can still be performed normally and orderly. In the chain structure or the mesh structure, a cooperative driving system or an operator may establish a new topological relationship, so as to perform a smooth operation and improve passing efficiency. After the new topological relationship is established, the cooperative driving system updates and saves the new topological relationship, and displays the new topological relationship on the interface. It may be understood that the foregoing faulty vehicle scenario is merely an example, and the operator or the cooperative driving system may further split and combine the parking location queue based on a time operation requirement. This is not limited in embodiments of this application.

In this embodiment of this application, the vehicle control apparatus 110 may perform parking location resource scheduling for the target vehicle in a target zone. A plurality of parking locations in the target zone may include a parking location that actually exists and is marked in the physical world, or may be parking locations that are not marked in the physical world. Optionally, the vehicle control apparatus 110 may preset related information of a parking location in the target zone based on an application requirement, a scenario, and the like, so as to perform parking location resource scheduling for a vehicle in the target zone based on the set parking location information. The following describes in detail the predefined related information of the parking location in this embodiment of this application with reference to the topological relationship. Details are not described herein.

Optionally, in different cases, the first parking location may be specifically implemented in a plurality of different manners based on a status of the target vehicle. For example, the first parking location may be a parking location for parking the target vehicle. When the target vehicle needs to travel to perform a related operation, the vehicle control apparatus 110 may perform parking location resource scheduling for the target vehicle based on the first parking location, to determine how the target vehicle travels. Alternatively, the first parking location may be any parking location passed by the target vehicle in a process of completing an operation task. The vehicle control apparatus 110 may perform parking location resource scheduling for the target vehicle based on the first parking location, to determine how the target vehicle continues to move. Alternatively, when the first parking location is a working location for the target vehicle to execute the operation task, the vehicle control apparatus 110 may perform parking location resource scheduling for the target vehicle based on the first parking location, and determine a parking location or a further waiting location that the target vehicle needs to go to, to determine whether the target vehicle ends the task or continues to execute another task. The following describes in detail vehicle control solutions in different cases with reference to different embodiments. Details are not described herein.

S220: The vehicle control apparatus 110 obtains the topological relationship.

In this embodiment of this application, the parking location is set to guide a plurality of vehicles to jointly complete some tasks. Therefore, to complete guidance, a plurality of parking locations may be preset and the plurality of parking locations may be configured. A logical topological relationship may exist among the plurality of parking locations. The topological relationship may indicate an association relationship between multi-level parking locations. Parking locations having a logical topological relationship may form a parking location queue (Location Queue).

FIG. 4 is a schematic diagram of a topological relationship of a parking location according to an embodiment of this application. Refer to FIG. 4. An arrow direction from left to right represents a sequence from an upstream parking location to a downstream parking location, and a column of rectangular frames from top to bottom represents a plurality of parking locations belonging to a same parking location level. A quantity of parking locations included in each level may not be limited to one, one parking location may have an upstream parking location and/or a downstream parking location, and a quantity of upstream parking locations and/or downstream parking locations included in one parking location may not be limited to one. In this embodiment of this application, for ease of differentiation, the multi-level parking locations indicated in the topological relationship may be separately referred to as a first-level parking location, a second-level parking location, a third-level parking location, and the like, and may be separately represented as a level 1, a level 2, a level 3, . . . , and a level n, where n represents a quantity of parking location levels, and n is an integer greater than or equal to 1.

For example, in FIG. 4, parking locations L1, L2, and L3 may belong to the level 1, parking locations L4 and L5 may belong to the level 2, parking locations L6 may belong to the level 3, parking locations L7, L8, and L9 may belong to the level 4, and parking locations L10 may belong to the level 5. A downstream parking location of parking locations L1 and L2 is L4, a downstream parking location of the parking location L3 is L5, a downstream parking location of the parking locations L4 and L5 is L6, downstream parking locations of the parking location L6 are L7, L8, and L9, and a downstream parking location of the parking location L9 is L10. Parking locations L1, L4, L6, and L7 may form a parking location queue. Parking locations L1, L4, L6, L8, and L10 may form a parking location queue. Parking locations L1, L4, L6, and L9 may form a parking location queue. Parking locations L2, L4, L6, and L7 may form a parking location queue. Parking locations L2, L4, L6, L8, and L10 may form a parking location queue. Parking locations L2, L4, L6, and L9 may form a parking location queue. Parking locations L3, L5, L6, and L7 may form a parking location queue. Parking locations L3, L5, L6, L8, and L10 may form a parking location queue. Parking locations L3, L5, L6, and L10 may form a parking location queue.

It should be noted that, in this embodiment of this application, the lane may also be referred to as a driving line or a vehicle lane, and is a road used by a vehicle to pass through. One road may include one or more lanes. Generally, an upstream/downstream relationship between roads or lanes needs to be connected by using a continuous lane center line, and different roads or different lanes cannot physically overlap with each other. In this embodiment of this application, an upstream/downstream relationship between parking locations is a logical relationship between the parking locations. The logical relationship is different from the upstream/downstream relationship between the roads or the lanes. Parking locations having the upstream/downstream relationship may be located on different lanes or different roads without a connection line, or may physically overlap with each other, provided that a vehicle can travel from an upstream parking location to a downstream parking location through a road network. In addition, in this embodiment of this application, one parking location can only be an upstream parking location or a downstream parking location of another parking location, and cannot be both an upstream parking location and a downstream parking location of another parking location.

It may be understood that a naming manner of the parking location level in this embodiment of this application is merely used to distinguish between different parking location levels, but is not used to limit a sequence, a function, or the like of the parking location or the parking location level. In the following, for ease of description, a parking location level to which the first parking location belongs may be referred to as a first level. A first-level parking location may further include another parking location other than the first parking location. A parking location level to which the second parking location allocated to the target vehicle belongs may be referred to as a second level. A second-level parking location may further include another parking location other than the second parking location. A parking location level to which a third parking location belongs is referred to as a third level. A third-level parking location may further include another parking location other than the third parking location. Distinguishing will not be performed one by one in the following description. In addition, the parking location queue in FIG. 4 is merely an example of a logical relationship between a plurality of parking locations having an upstream/downstream relationship, and does not limit a location relationship, a distance, and the like between the parking locations. Logical depths of parking locations included in different parking location queues may be different. To be specific, quantities of parking location levels included in different parking location queues may be different.

It should be noted that S210 and S220 are merely examples of steps, and an execution sequence of the two steps is not limited. In another embodiment, S220 may be performed before S210, or S210 and S220 may be performed simultaneously. The vehicle control apparatus 110 may further determine the target vehicle based on the topological relationship. For example, the first-level parking location includes a plurality of parking locations, and the target vehicle is the only vehicle in the plurality of parking locations, or a vehicle with a highest task priority, or a vehicle that first arrives in a plurality of vehicles with a same task priority. Alternatively, the multi-level parking location includes a third-level parking location. The third-level parking location includes at least one upstream parking location of the first-level parking location, and the target vehicle is a vehicle with a highest task priority in the at least one upstream parking location of the first-level parking location, or a vehicle that first arrives in a plurality of vehicles with a same task priority, or a vehicle closest to the first-level parking location.

S230: The vehicle control apparatus 110 allocates the second parking location to the target vehicle based on the topological relationship.

In this embodiment of this application, the second parking location is an idle parking location in the second-level parking location.

For example, based on a type, a purpose, or the like of a parking location that needs to be allocated to the target vehicle, the second parking location may be a destination parking location (or referred to as a working location) of the target vehicle, and the target vehicle may move to the second parking location and execute a corresponding operation task. Alternatively, the second parking location may be a first waiting parking location of the target vehicle, the first waiting parking location may be an upstream parking location of a destination parking location of the target vehicle, and the target vehicle may first move to the first waiting parking location and wait before moving to the destination parking location. Alternatively, the second parking location may be a second waiting parking location of the target vehicle, the second waiting parking location may be a waiting parking location after a destination parking location of the target vehicle, and the target vehicle may move to the second waiting parking location and wait after moving away from the destination parking location. Alternatively, the second parking location may be a parking location of the target vehicle, may be used to park the target vehicle, may be a parking location of the target vehicle after the target vehicle completes one operation task and before the target vehicle performs a next operation task, or may be a long-time parking location of the target vehicle. It may be understood that the description is merely an example of the second parking location for description herein, but is not any function limitation. In another embodiment, a parking location of another purpose or type may be defined based on an operation requirement, a scenario, or the like, and parking location resource management and scheduling are performed for the target vehicle. This is not limited in embodiments of this application.

The topological relationship shown in FIG. 4 is used as an example. The vehicle control apparatus 110 may allocate the second parking location to the target vehicle based on the first parking location and the topological relationship. For example, when the first parking location is the parking location L1 and the parking location L4 is idle, the vehicle control apparatus 110 may allocate the parking location L4 to the target vehicle as the second parking location of the target vehicle. Alternatively, when the first parking location is L1 and the destination parking location L6 of the target vehicle is idle, the vehicle control apparatus 110 may allocate the parking location L6 to the target vehicle as the second parking location of the target vehicle. Alternatively, when the first parking location is L1 and the destination parking location of the target vehicle is the non-idle parking location L6, the vehicle control apparatus 110 may allocate the idle parking location L4 to the destination parking location as the second parking location of the target vehicle, so that the target vehicle may first move from the first parking location to the second parking location, and wait until the destination parking location L6 of the target vehicle is idle and available. Alternatively, when the first parking location is the parking location L6, the vehicle control apparatus 110 may allocate the parking location to the target vehicle as the second parking location of the target vehicle based on the topological relationship, so that the target vehicle moves away from an operation zone. Alternatively, when the first parking location is the parking location L6 and the target vehicle cannot move away from an operation zone temporarily, the vehicle control apparatus 110 may allocate a downstream idle parking location of the parking location L6 to the target vehicle, for example, one of parking locations L7, L8, L9, or L10, as the second parking location of the target vehicle.

S240: The vehicle control apparatus 110 indicates the target vehicle to move from the first parking location to the second parking location.

S250: The target vehicle moves from the first parking location to the second parking location based on the indication of the vehicle control apparatus 110.

In this embodiment of this application, when S240 and S250 are implemented, the vehicle control apparatus 110 may control movement of the target vehicle in a plurality of different manners. This is not limited in embodiments of this application.

For example, in S240, the vehicle control apparatus 110 may send indication information to the target vehicle, where the indication information may indicate the second parking location. The indication information may include, for example, a parking location identifier of the second parking location, an identifier of a map to which the second parking location belongs, an identifier of a road to which the second parking location belongs, and an identifier of a lane to which the second parking location belongs, and may be used to uniquely identify the second parking location. In S250, the destination parking location may be moved from the first parking location to the second parking location based on the indication information.

For another example, in S240, the vehicle control apparatus 110 may send a parking location number of the second parking location in the corresponding topological relationship to the target vehicle. A local database of the target vehicle may pre-store the topological relationship. In S250, after the parking location number is received, the target vehicle may move from the first parking location to the second parking location based on the topological relationship and the parking location number.

For another example, in S240, the vehicle control apparatus 110 may send a target path to the target vehicle, where the target path may include a parking location identifier of the second parking location and/or a set of location points that the target vehicle passes through in a process of traveling toward the second parking location in the future. In S250, the target vehicle may move from the first parking location to the second parking location based on the target path.

Thus, according to the foregoing solution, the vehicle control apparatus 110 allocates the second parking location to the target vehicle, and indicates the target vehicle to move from the first parking location to the second parking location, so that the target vehicle may move based on a proper moving route, to execute an operation task at a proper occasion. This helps a vehicle platoon in which the target vehicle is located to operate in an orderly manner, and improves overall operation efficiency of the vehicle platoon.

In a possible implementation, to flexibly implement parking location resource management and scheduling, the topological relationship obtained in step S220 may be obtained by performing related attribute configuration when a plurality of parking locations in the target zone are preset. The topological relationship may include a plurality of pieces of parking location attribute information and/or a plurality of pieces of parking location queue attribute information, as shown in Table 1 or Table 2 below. The plurality of pieces of parking location queue attribute information may also be used as parking location attribute information and incorporated into Table 1. Specific implementation of related attribute information is not limited in this application.

It should be understood that, in this embodiment of this application, the plurality of pieces of parking location attribute information and/or the plurality of pieces of parking location queue attribute information may be configured based on an application requirement, and in different application requirements or application scenarios, the plurality of pieces of parking location attribute information and/or the plurality of pieces of parking location queue attribute information may be flexibly updated, adjusted, or the like. The topological relationship may be stored in a local database of the vehicle control apparatus. When S220 is implemented, the vehicle control apparatus 110 may obtain the topological relationship from the local database. Alternatively, the topological relationship may be stored in another device. When S220 is implemented, the vehicle control apparatus may obtain the topological relationship from the another device. A manner of obtaining the topological relationship is not limited in embodiments of this application.

In this embodiment of this application, there may be a plurality of implementations when the parking location, the topological relationship, and the parking location attribute information and the parking location queue attribute information in the topological relationship are predefined. Correspondingly, there may be a plurality of implementations when parking location resource scheduling is performed for the target vehicle based on the topological relationship. The vehicle control apparatus 110 may flexibly perform parking location resource scheduling for the target vehicle, to help the target vehicle and the vehicle platoon to which the target vehicle belongs operate in an orderly manner, so as to improve overall operation efficiency of the vehicle platoon. For ease of understanding, the following first describes related attribute information of a predefined parking location or parking location queue with reference to Table 1 and Table 2, and then describes specific implementations of steps in S210 to S240 by using examples with reference to Table 1 and Table 2.

definition information of corresponding parking location attributes, including: a type of the attribute, which indicates a data type corresponding to an attribute, for example, an integer (Integer) type, a string (String) type, an enumeration (Enum) type, a double-precision floating point (Double) type, a map point (MapPoint) type, and an integer type array (List<Integer>); attribute definition, for example, a related identifier, a physical size, a type, an availability status, stay duration, and identifier sets of upstream and downstream parking locations of a parking location; and other related information described in the remarks, where for details, refer to Table 1 and corresponding explanations below. It should be understood that the description is merely an example of the parking location attribute for description herein, but is not any limitation. During specific implementation, another

TABLE 1

| Name | Type | Definition | Remarks |
|---|---|---|---|
| id | Integer | Unique identifier of an entire map | Primary key id |
| map_id | String | Map id, which is used to distinguish different maps | Map switching |
| road_id | Integer | Road ID | |
| lane_id | Integer | Lane ID | |
| description | String | Parking location description | Non-navigation attribute bearing |
| length | Double | Length, in meters | |
| width | Double | Width, in meters | |
| ref_position | MapPoint | Parking location (Location) geometric center | Vehicle-road matching and location allocation |
| location_type | Enum | Parking location type | For example, including charging (CHARGE); parking (PARK); working (WORK); waiting (WAIT); and dynamically configurable |
| status | Enum | Parking location availability status, which is available by default | 1. OPEN: open; 2. CLOSE: close |
| duration_of_stay | Integer | Stay duration, in seconds | Duration during which a vehicle can stay after completing an operation when location_type is WORK, or duration during which a vehicle can be parked temporarily when location_type is WAIT |
| upstream_location_ids | List<Integer> | Upstream parking location ID set | Location queue management |
| downstream_location_ids | List<Integer> | Downstream parking location ID set | Location queue management |

As shown in Table 1, the first column shows examples of names of related parking location attributes defined for a parking location, including an identifier (id) of the parking location, an identifier (map_id) of a map to which the parking location belongs, an identifier (road_id) of a road on which the parking location is located, an identifier (lane_id) of a lane on which the parking location is located, a parking location description (description), a parking location length (length), a parking location width (width), a reference position (ref_position), a location type (location_type), a status (status), stay duration (duration_of_stay), an identifier set of an upstream parking location (upstream_location_ids), an identifier set of a downstream parking location (downstream_location_ids), and the like. Correspondingly, the second column to the fourth column are separately related parking location attribute may be alternatively defined based on an operation requirement, an application scenario, and the like. This is not limited in embodiments of this application.

One or more of the id, map_id, road_id, and lane_id fields may be used to uniquely identify a parking location. Specifically, the id field is used to carry a primary key identifier of a parking location, the id is a unique identifier in the entire map, and the map_id is used to carry identification information of different maps. When different maps are switched, information in the id field may be combined with information in the map_id field to distinguish parking locations in the different maps. The road_id field is used to carry an identifier of a road on which a parking location is located, and the lane_id is used to carry an identifier of a lane on which a parking location is located. When different roads or different lanes on a map are involved, information in the id field may be combined with information in the road_id field and/or the lane_id field to distinguish parking locations on the different roads or lanes. This is similar in different maps. Details are not described herein again.

The description field may be used to carry information for describing a bearer attribute of a parking location, for example, whether the parking location is a navigation attribute bearer or a non-navigation attribute bearer, that is, whether the parking location is a traveling location in a navigation path. Based on different production requirements, parking locations corresponding to a same location may have different bearer attributes.

The length field or the width field may be respectively used to carry a length or a width that indicates a physical size of a parking location. In a commercial vehicle production environment, the parking location may be the consistent with the lane in width. Therefore, the width field may be optional. The ref_position field indicates a reference position of a parking location. The reference position may be used as a location reference of a parking location when the vehicle control apparatus 110 performs road matching, parking location allocation, or path planning for the vehicle, and indicates a specific location of the parking location in a corresponding map. It should be understood that a specific value of the reference position may be coordinates (x, y) of a geometric center, or may be other information indicating a location. A specific representation manner of the reference position is not limited in embodiments of this application.

The location_type field may be used to carry information indicating a type of a parking location, and corresponds to a specific purpose of the parking location. For example, "CHARGE" indicates that the parking location may be used for vehicle charging. "PARK" indicates that the parking location may be used for parking a vehicle. "WORK" indicates that the parking location may be used for performing an operation task, namely, a working location. "WAIT" indicates that the parking location may be used for temporarily parking a vehicle, namely, a waiting location. During specific implementation, the type of the parking location may alternatively be configured based on a production requirement or the like, and may include but is not limited to various types described in the foregoing examples.

The status field may be used to carry information indicating a status of a parking location. Generally, the status of the parking location is "available" by default, which corresponds to "open (open)", it indicates that the parking location is a parking location that may be allocated to a vehicle. When the status of the parking location is "unavailable", which corresponds to "close (close)", it indicates that the parking location cannot be allocated to a vehicle currently. In this case, it indicates that the parking location cannot participate in a subsequent parking location resource scheduling process. It should be noted that the description is merely an example rather than a limitation of the status of the parking location in this embodiment of this application.

In another embodiment, the status field may further use another value or be dynamically configured or adjusted to indicate another status of the parking location, for example, whether the parking location is idle, whether the parking location is occupied/reserved by another vehicle, or whether the parking location needs to be preferentially allocated to another vehicle. These statuses and field values indicating these statuses may be configured in a predefined phase or updated in a parking location resource scheduling process. Further, the vehicle control apparatus may make a decision based on the status of the parking location, to determine whether a corresponding parking location may be allocated to a vehicle. Details are not described herein again.

The duration_of_stay field may be used to carry stay duration in a parking location, namely, maximum duration for which a vehicle is allowed to stay. Setting of this field is related to the parking location type and is optional. For example, when the parking location type is "working (WORK)", the duration_of_stay field is used to carry a threshold of duration for which a vehicle that has completed an operation can stay in the working location. When the parking location type is "WAIT", the duration_of_stay field is used to carry maximum duration for which a vehicle is parked temporarily in a waiting location. When the parking location type is "CHARGE" or "PARK", parking duration of a vehicle in the parking location is not limited.

The upstream_location_ids field may be used to carry an identifier set of an upstream parking location of a parking location, for example, in FIG. 4, identifiers of upstream parking locations L4 and L5 of the parking location L6, and identifiers of upstream parking locations L1 and L2 of the parking location L4. The identifier set of the upstream parking location may be used for parking location queue management. For example, an upstream waiting location is allocated to a vehicle that needs to move to a parking location based on a parking location queue to which the parking location belongs.

The downstream_location_ids field may be used to carry an identifier set of a downstream parking location of a parking location. For example, in FIG. 4, identifiers of downstream parking locations L7, L8, and L9 of the parking location L6 and identifiers of the downstream parking location L4 of the parking location L1 may be used for parking location queue management. For example, a downstream parking location is allocated to a vehicle located in the parking location based on a parking location queue to which the parking location belongs.

It should be noted that the parking location attribute information and a function of each piece of parking location attribute information are merely examples for description. When a production requirement changes, other parking location attribute information may be further configured and a function of corresponding parking location attribute information may be further defined based on the changed production requirement. This is not limited in embodiments of this application. Details are not described herein again.

TABLE 2

| Name | Type | Definition | Remarks |
|---|---|---|---|
| id | Integer | Unique identifier of an entire map | Primary key id |
| map_id | String | Map id, which is used to distinguish a plurality of maps | Map switching |
| description | String | Parking location | Non-navigation attribute bearing |

TABLE 2-continued

| Name | Type | Definition | Remarks |
|---|---|---|---|
| | | queue description | |
| capacity | Integer | Capacity of a parking location queue | Used for queue management. The capacity of the parking location queue used when a parking location resource is allocated to a vehicle cannot exceed a quantity of parking locations in the queue |
| compact_parking | Boolean | Whether to be compact parking | To improve space utilization, a parking location needs to be designed in a compact parking manner. To be specific, a front vehicle and a rear vehicle are close to each other, and the rear vehicle can travel only after the front vehicle travels |
| vehicle_sequencing | Boolean | Whether to support vehicle sequencing | In some scenarios, commercial vehicles have requirements on a sequence of a vehicle arriving at an operation location. Therefore, the sequence needs to be adjusted through a queue. |

In Table 2, the first column shows examples of names of related parking location queue attributes defined for a parking location queue, including an identifier (id) of the parking location queue, an identifier (map_id) of a map to which the parking location queue belongs, a description (description) of the parking location queue, a capacity (capacity) of the parking location queue, compact parking (compact_parking) indication information, vehicle sequencing (vehicle_sequencing) indication information, and the like. Correspondingly, the second column to the fourth column are separately definition information of corresponding parking location queue attributes, including: a type of the attribute, for example, a Boolean (Boolean) type, where for another type, refer to related descriptions in Table 1, and details are not described herein again; definition of the attribute, for example, a related identifier of a parking location, a description, a capacity, a queue type, and whether to support sequencing; and other information described in the remarks. It should be understood that the description is merely an example of the parking location queue attribute for description herein, but is not any limitation. During specific implementation, another parking location queue attribute may be further defined based on an operation requirement, an application scenario, and the like. This is not limited in embodiments of this application.

The id field and/or the map_id field may be used to uniquely identify a parking location queue. Specifically, the id field is used to carry a primary key identifier of a parking location queue, and the map_id is used to carry information that identifies different maps. When different maps are switched, information in the id field may be further combined with information in the map_id field to distinguish parking location queues in the different maps.

The description field may be used to carry information for describing a bearer attribute of a parking location queue, for example, whether the parking location queue is a navigation attribute bearer or a non-navigation attribute bearer, that is, whether the parking location queue is a parking location queue including traveling locations in a navigation path. Based on different production requirements, parking location queues corresponding to a same location may have different bearer attributes.

The capacity field may be used for a capacity of a parking location queue, for example, a quantity of parking locations that may be included in the parking location queue. The capacity field may be used to manage the parking location queue. Generally, the capacity field may be used when a parking location resource is allocated to a vehicle. A quantity of vehicles to which the parking location queue is allocated generally cannot be greater than the quantity of parking locations included in the parking location queue.

The compact_parking field may be used to carry information indicating whether a parking location queue has a compact parking attribute. In this embodiment of this application, the compact parking attribute indicates whether the parking location queue is designed as a parking location queue used for compact parking. Generally, for a parking location queue that does not have a compact parking attribute, a value of the compact_parking field may be false (false) or 0. For a parking location queue that has a compact parking attribute, a value of the compact_parking field is true (true) or 1. Based on the compact parking location queue, the vehicle control apparatus 110 may allocate dense parking locations to vehicles, to improve space utilization in the target zone. Generally, a distance between front and rear parking locations (or left and right parking locations) of a compact parking location queue is short. A parking sequence of a plurality of parking locations included in the parking location queue is fixed, and a rear vehicle needs to travel after a front vehicle travels. Therefore, the compact_parking attribute may further affect a parking sequence of the vehicles. The compact_parking field may also be used by the vehicle control apparatus 110 to perform parking location resource scheduling.

The vehicle_sequencing field may be used to carry information indicating whether a parking location queue supports parking location sequencing. Generally, for a parking location queue that does not support the parking location sequencing attribute, the vehicle_sequencing field may be empty or 0. For a parking location queue that supports the parking location sequencing attribute, the vehicle_sequencing field may be not empty or 1. In a commercial vehicle production environment, in some scenarios, there is a requirement on a sequence in which vehicles arrive at a working location and complete an operation. When a vehicle_sequencing field of a target parking location queue of the vehicles is empty or 0, it indicates that there is no parking location sequencing requirement, and an operation sequence requirement does not need to be considered when parking location resources are allocated to the vehicles. When the vehicle_sequencing field of the target parking location queue of the vehicles is not empty or is 1, it indicates that the target parking location queue has a parking location sequence adjustment requirement. When parking location resource scheduling is performed for the vehicles, a sequence of performing an operation task by the vehicles further needs to be considered, so that a vehicle that needs to perform an operation first can operate first, and a vehicle that is not arranged in an operation sequence can operate later.

It should be understood that Table 1 and Table 2 are merely examples of the parking location attribute or the parking location queue attribute information, but are not any limitation. In another embodiment, Table 1 may further include, for example, a number of a parking location in a corresponding parking location queue, and the parking location queue attribute information may further include, for example, numbers of a plurality of parking locations included in the parking location queue. Alternatively, Table 1 may further include a parking location capacity, which may be generally 1 by default. In other requirements, the parking location capacity may also be set to another value, for example, 2 or 3. When allocating a parking location in a target parking location queue to a vehicle, the vehicle control apparatus 110 may further use, for example, a parking location number as a unique identifier of the parking location, to indicate the vehicle to move to the corresponding parking location.

Based on the related attribute information described in Table 1 and Table 2, the vehicle control apparatus 110 may perform parking location resource scheduling for a plurality of vehicles that compete for a same resource in the target zone. In this embodiment of this application, to improve overall operation efficiency of the plurality of vehicles, corresponding guidance rule information may be further set, so that the vehicle control apparatus may perform parking location resource scheduling based on the guidance rule information, to obtain a more proper allocation result. For example, the guidance rule information may include but is not limited to the following information:

(1) when a destination parking location involved in a task of a vehicle is idle and available, a path from the vehicle to the destination parking location is directly planned;

(2) when a destination parking location involved in a task of a vehicle is occupied or reserved by another vehicle, for the vehicle, a related temporary parking location is searched, the vehicle is planned to a path to the temporary parking location, and the temporary parking location is planned to a path to the destination parking location when the destination parking location is idle and available;

(3) when a destination parking location involved in a task of a vehicle is idle and available, but there is another vehicle whose task priority is higher than that of the vehicle, the vehicle needs to be guided to a related temporary parking location, and the vehicle is guided to the destination parking location after the another vehicle whose task priority is higher completes an operation; and (4) in a case in which a planned path (non-task-triggered) is triggered by a parking location or a parking location queue attribute, a plurality of vehicles that compete for a same resource are determined based on the planned path, and parking location resource scheduling is performed based on the guidance rule information described in (1) to (3).

In a specific application, the vehicle control apparatus 110 may cooperatively perform vehicle control based on the related attribute information in Table 1 and/or Table 2, to determine a target vehicle for which parking location resource scheduling needs to be performed, determine a second parking location allocated to the target vehicle, and indicate the target vehicle to move.

For example, the parking location type "location_type" indicates a type of a parking location. A parking location queue shown in FIG. 6 may include one working (WORK) location used to execute an operation task and a plurality of waiting (WAIT) locations used for a vehicle to wait and temporarily stay. The waiting location may be located in an upstream and/or a downstream of the working location. Corresponding production data may be configured on the working location. In one task, a plurality of vehicles may be specified to operate in the working location. In this case, the vehicle control apparatus 110 may allocate parking locations to the plurality of vehicles based on the parking location queue shown in FIG. 6, so that the plurality of vehicles may operate in an orderly manner. When a vehicle sequencing attribute (vehicle_sequencing) of the parking location queue is true (true), it indicates that when allocating a parking location resource to a vehicle based on the parking location queue, the vehicle control apparatus 110 needs to consider a constraint on a completion sequence of vehicle tasks (for example, a packing sequence in a port scenario). In this case, when a destination parking location of the vehicle, for example, the working location shown in FIG. 6, has been occupied or reserved by another vehicle, the vehicle control apparatus 110 may allocate an upstream first waiting location to a to-be-operated vehicle based on the constraint of the completion sequence and a topological relationship of the parking location queue. In addition, a vehicle that has completed an operation does not necessarily need to immediately move away from the parking location queue, and the vehicle control apparatus 110 may further allocate a downstream second waiting location to the vehicle that has completed the operation based on the constraint of the completion sequence and the topological relationship.

Because different parking location attribute information or parking location queue attribute information has different purposes during parking location resource scheduling, for ease of understanding, the following describes specific implementation details of the vehicle control solution in this application with reference to the accompanying drawings and embodiments.

Figure 7A:
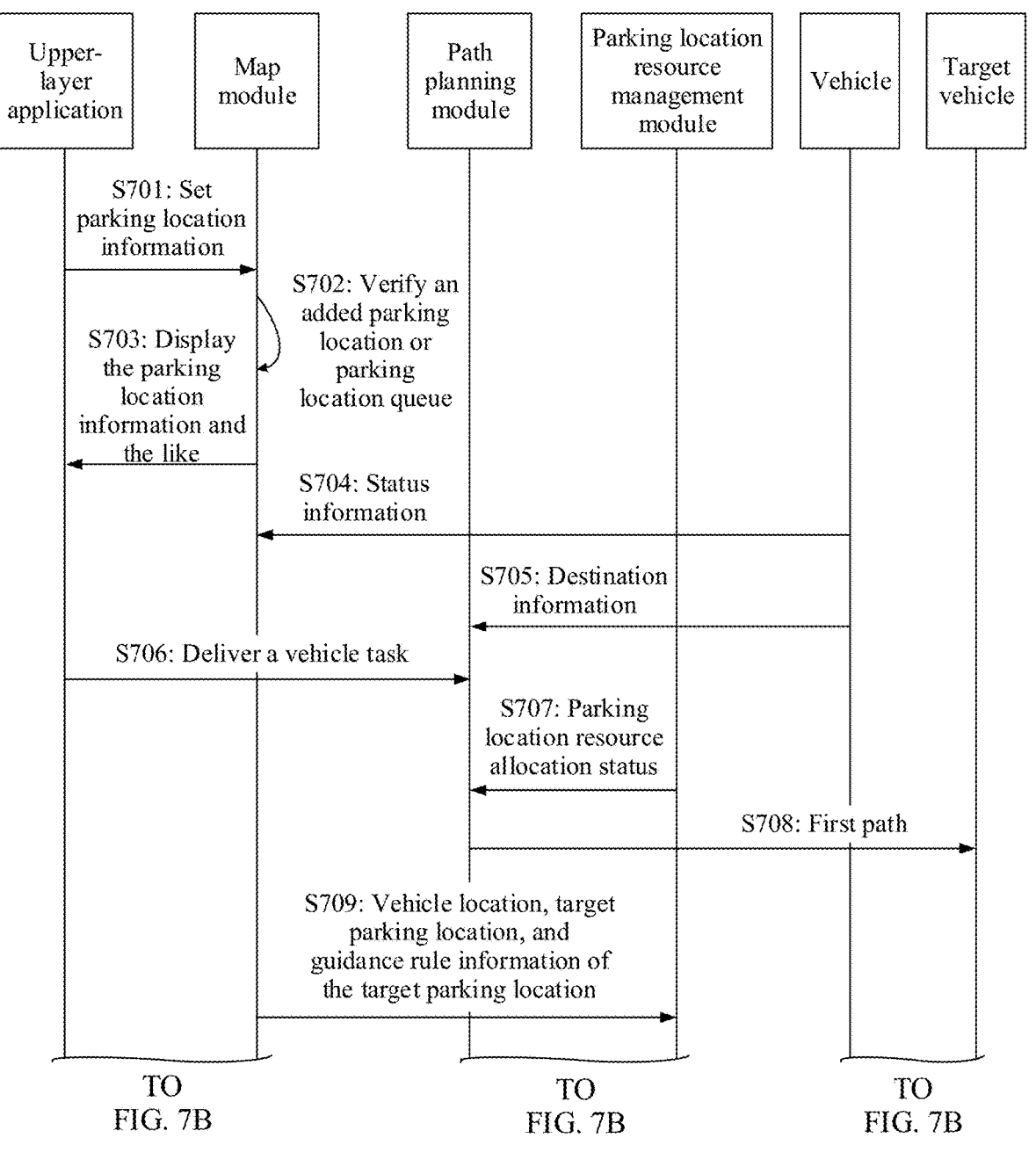
FIG. 7A and FIG. 7B are a schematic flowchart of a vehicle control method according to an embodiment of this application.
Figure 7B:
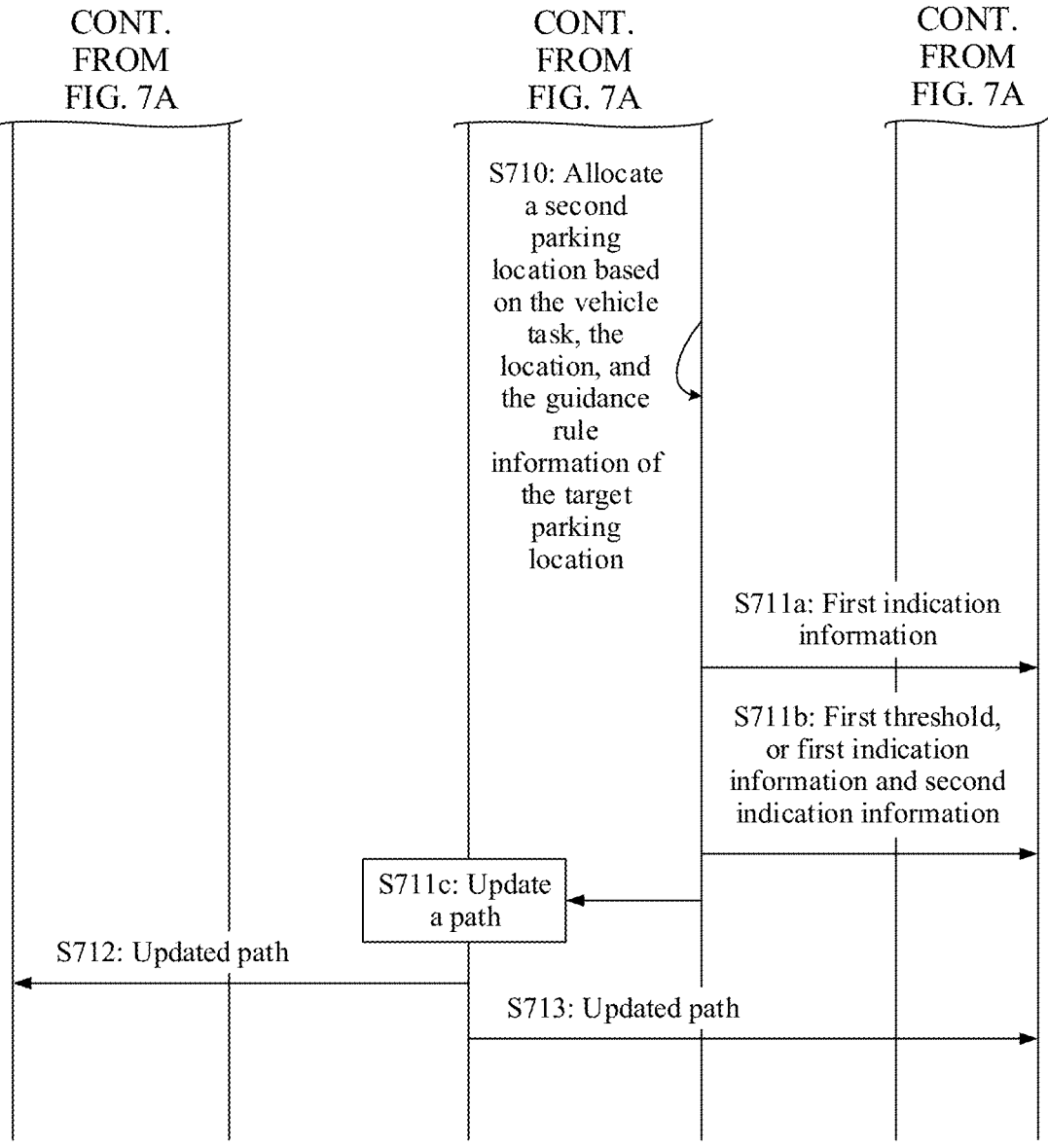

FIG. 7A and FIG. 7B show a flowchart of a vehicle control method according to an embodiment of this application. Refer to FIG. 7A and FIG. 7B. The vehicle control method may include the following steps.

S701: An upper-layer application sets parking location information in a vehicle control apparatus.

In this embodiment of this application, different from elements such as a road and a lane, parking locations set in S701 may be parking locations that actually exist in the physical world, or may be generated by the vehicle control apparatus 110 based on operation requirements. These parking locations may be displayed on a user interface. An operator may set a parking location on a map of a target zone by using the upper-layer application, and define a parking location attribute, a topological relationship, a parking location queue attribute, guidance rule information that needs to be followed for parking location resource scheduling, and the like.

When setting the parking location information, the upper-layer application may set an attribute of an existing parking location, an attribute of a corresponding parking location queue, or the like, or may add a parking location or a parking location queue. A map module in the vehicle control apparatus 110 may verify the added parking location or the added parking location queue. For example, for security purposes, the added parking location or parking location queue cannot be set at a road junction, and a feature rectangle representing a parking location cannot cross a plurality of lanes. If the verification is successful, the added parking location can be allowed to be set. If the verification fails, the vehicle control apparatus 110 may refuse to set the parking location or the parking location queue. After the parking location is set, obtained map information, parking location information, topological relationship, related attribute information, guidance rule information, and the like of the target zone may be used by the vehicle control apparatus 110 to perform parking location resource management and scheduling for a vehicle in the target zone.

S702: The map module verifies the added parking location or parking location queue.

S703: Display a location of a parking location, a topological relationship, guidance rule information, and the like in the target zone on a user interface of the upper-layer application.

S704: The vehicle in the target zone reports status information of the vehicle to the vehicle control apparatus (which may be specifically, for example, the map module in the vehicle control apparatus), where the status information may include at least one of the following: a location, a speed, and a heading angle.

The location information reported by the vehicle may be used to locate a current location of the vehicle, and may be used to determine a parking location queue to which the vehicle may belong. The speed information reported by the vehicle may be used to estimate time required for the vehicle to travel to a next parking location. The heading angle reported by the vehicle may be used to determine a traveling direction of the vehicle. A target parking location queue to which the vehicle belongs may be determined based on the current location and the heading angle of the vehicle. Time required for the vehicle to travel to a downstream parking location in the parking location queue to which the vehicle may belong may be determined based on the speed and the heading angle of the vehicle. Time required for the vehicle to travel from the current location to a downstream parking location in the target parking location queue of the vehicle may be determined based on the current location, the speed, and the heading angle of the vehicle.

It may be understood that, in this embodiment of this application, any vehicle in the target zone may report related status information of the vehicle to the vehicle control apparatus or a related module of the vehicle control apparatus in real time or periodically. This embodiment of this application imposes no limitation on execution steps of S704.

S705: The vehicle in the target zone reports destination information of the vehicle to the vehicle control apparatus (which may be specifically, for example, a path planning module in the vehicle control apparatus), where the destination information may indicate a destination of the target vehicle. It may be understood that, in this embodiment of this application, any vehicle in the target zone may report destination information of the vehicle to the vehicle control apparatus or a related module of the vehicle control apparatus when necessary. For example, the vehicle is a vehicle in a manual driving mode or a partially autonomous driving mode. This embodiment of this application imposes no limitation on execution steps of S705.

S706: The operator may deliver a vehicle task to the path planning module in the vehicle control apparatus 110 based on related information displayed in the user interface of the upper-layer application, where the vehicle task may be an operation task, and indicates the vehicle to perform a related operation; alternatively, the vehicle task may be a travel task, and indicates the vehicle to move away from a parking location in which the vehicle is currently located; alternatively, the vehicle task may be a parking task, and indicates a traveled vehicle to go to a related parking location; and if the vehicle task is a task for specifying a destination of a vehicle, and the destination is specifically a destination parking location, the vehicle task needs to carry information about the destination parking location, for example, a parking location identifier and a parking location number, so that the path planning module may plan a path for the vehicle based on the destination parking location information, and match a corresponding target parking location queue; or if the vehicle task does not specify a destination parking location of a vehicle, the path planning module may query a corresponding matched destination parking location or target parking location queue for the vehicle based on a task type.

It should be noted that, in this embodiment of this application, S704 to S706 only indicate that the vehicle control solution may include a step of reporting the status information by the vehicle, or reporting the destination information by the vehicle, or delivering the vehicle task by the upper-layer application, and do not limit the steps. During specific implementation, the vehicle may report only the status information but do not report the destination information, and the destination information of the vehicle may be included in the vehicle task delivered by the upper-layer application. Alternatively, the vehicle may report the status information and the destination information of the vehicle by using same signaling. The related information reported by the vehicle may alternatively be reported to another module in the vehicle control apparatus. Details are not described herein again.

In the following steps, the status information and/or the destination information reported by the vehicle may be used as information for describing an actual situation of the vehicle, and are provided to a related module of the vehicle control apparatus, for example, the map module, a parking location resource management module, or the path planning module, so that the vehicle control apparatus may flexibly perform parking location resource scheduling for a target vehicle in a plurality of vehicles based on status information and/or destination information of the plurality of vehicles, to reduce a long-time waiting problem of some vehicles, a circling problem, or the like due to improper cooperative control on the plurality of vehicles, so as to improve overall operation efficiency of a vehicle platoon formed by the plurality of vehicles. Optionally, when the vehicle control apparatus periodically performs parking location resource scheduling, the vehicle periodically reports the status information, and the vehicle periodically reports the destination information, a periodicity of reporting the status information by the vehicle or a periodicity of reporting the destination information by the vehicle is less than or equal to a periodicity of performing parking location resource scheduling by the vehicle control apparatus 110 for the vehicle.

S707: The path planning module queries a resource allocation status of the destination parking location or the target parking location queue from the parking location resource management module.

When the destination parking location or the target parking location queue does not reach a corresponding capacity upper limit (namely, a maximum value of a quantity of vehicles that can be accommodated simultaneously, where the capacity upper limit of the destination parking location may be 1, and the capacity upper limit of the target parking location queue may be a quantity of a plurality of parking locations included in the target queue), the path planning module may be allowed to determine a running route of the vehicle based on a plurality of pieces of parking location attribute information in the map information, and deliver a corresponding vehicle operation task to the vehicle, so that the vehicle can move to the destination parking location or the target parking location queue based on the running route. When the target parking location queue has reached the capacity upper limit, it indicates that the destination parking location or the target parking location queue is currently saturated and cannot accommodate another vehicle. In this case, the path planning module needs to temporarily suspend the vehicle operation task, and the parking location resource management module may perform parking location resource scheduling. The path planning module may query the resource allocation status of the destination parking location or the target parking location queue in real time or periodically, and when the destination parking location or the target parking location queue does not reach a corresponding capacity upper limit, restore a previously suspended task, and the path planning module is allowed to determine the running route of the vehicle based on the plurality of pieces of parking location attribute information in the map information, and deliver the corresponding vehicle operation task to the vehicle, so that the vehicle moves to the destination parking location or the target parking location queue based on the running route.

The plurality of pieces of parking location attribute information used by the path planning module to determine the running route for the vehicle may include but is not limited to one or more of the items shown in Table 1 and Table 2. For example, the vehicle task received by the path planning module may include destination information, and the destination information may indicate the destination parking location of the vehicle. The path planning module may determine the running route of the vehicle based on attribute information of the destination parking location, for example, a related identifier, a parking location type, an identifier set of an upstream parking location, and an identifier set of a downstream parking location. For example, when the parking location type of the destination parking location is "CHARGE" or "PARK", the destination parking location is directly planned as a destination of the vehicle. For another example, when the parking location type of the destination parking location is "WORK", an idle parking location in an upstream parking location of the destination parking location is used as a temporary parking location of the vehicle and planned into the running route of the vehicle based on the identifier set of the upstream parking location of the destination parking location. For another example, when the vehicle task is a travel task, and a parking location in which the vehicle is currently located belongs to a compact parking location queue and is not located in a downstreammost parking location of the parking location queue, the path planning module may plan an identifier set of a downstream parking location of the parking location into a travel route of the vehicle. It may be understood that this is merely an example of an implementation in which the path planning module determines the running route of the vehicle based on the plurality of pieces of parking location attribute information. In another embodiment, the path planning module may combine, based on a requirement, one or more pieces of attribute information shown in Table 1 and Table 2 to perform path planning for the vehicle. Details are not described herein again.

In the parking location resource scheduling process, the parking location resource management module may search for a task and a planned route of each vehicle in the target zone, manage and schedule, in a unified manner, a plurality of vehicles that need to go to a same destination parking location or a same target parking location queue, and allocate specific parking location resources to the plurality of vehicles based on corresponding guidance rule information. The path planning module may interact with the parking location resource management module, to control the plurality of vehicles in the target zone to move to corresponding parking locations in real time or periodically based on a parking location resource allocation result obtained by the parking location resource management module by performing parking location resource scheduling, so as to perform operations in an orderly manner.

S708: The path planning module delivers a first path to a target vehicle in the plurality of vehicles, where the first path may indicate a first parking location and a set of location points that the target vehicle passes through in a process of moving to the first parking location.

Further, the target vehicle may move from a currently located parking location to the first parking location based on the first path. The current parking location is a location of each vehicle when the upper-layer application triggers a task. The current parking location of each vehicle may be actively reported by each vehicle (for example, in S703), or may be reported by each vehicle (for example, in S703) after the vehicle control apparatus 110 delivers query information to each corresponding vehicle (not shown in the figure) before the task needs to be delivered. In S707, the path planning module may perform unified planning and management based on the current parking location of each vehicle, to obtain the first parking location to which each of the vehicles needs to move in a next step.

S709: The parking location resource management module queries, from the map module, vehicle locations and destination parking locations of the plurality of vehicles, guidance rule information of the destination parking locations, and the like.

S710: The parking location resource management module determines the target vehicle based on the vehicle task, the vehicle locations of the plurality of vehicles, the guidance rule information of the destination parking location, and the like, and allocates a parking location resource, namely, a second parking location, to the target vehicle that is in the first parking location. For specific implementation, refer to related descriptions in the following with reference to FIG. 8. Details are not described herein.

S711: The vehicle control apparatus indicates the target vehicle to move from the first parking location to the second parking location.

Situation 1

S711*a*: The parking location resource management module sends first indication information to the target vehicle, where the first indication information may include an identifier of the second parking location, an identifier of a map to which the second parking location belongs, an identifier of a road to which the second parking location belongs, an identifier of a lane to which the second parking location belongs, or the like.

Alternatively, the first indication information may include a parking location number of the second parking location in a corresponding parking location queue.

Correspondingly, the target vehicle may move from the first parking location to the second parking location based on the first indication information.

Situation 2

S711*b*: The parking location resource management module obtains stay duration in the first parking location, namely, a first threshold, by querying Table 1. Further, when stay duration of the target vehicle in the first parking location is greater than or equal to the first threshold, the target vehicle is indicated to move from the first parking location to the second parking location.

Alternatively, the parking location resource management module may send first indication information and second indication information to the target vehicle. The first indication information may include various identifiers or parking location numbers shown in the foregoing situation 1, and the second indication information may include the stay duration in the first parking location, namely, the first threshold. Correspondingly, the target vehicle may move from the first parking location to the second parking location when determining that the stay duration of the target vehicle in the first parking location is greater than or equal to the first threshold.

Situation 3

S711*c*: The path planning module may update a path of the target vehicle based on the parking location resource allocation result of the parking location resource management module. Similar to the foregoing implementation process, when the path is updated in S711*c*, the path planning module may also update the path based on a plurality of pieces of attribute information in the map, to obtain an updated running route of the target vehicle. For detailed implementation, refer to the foregoing related descriptions. Details are not described herein again.

The path may include indication information of the second parking location and a set of location points that the target vehicle needs to pass through when moving from the first parking location to the second parking location. S712: The path planning module uploads the updated path of the target vehicle to the upper-layer application. Further, the operator may view the running route of the target vehicle on the user interface of the upper-layer application. S713: The path planning module delivers the updated path of the target vehicle to the target vehicle. Further, the target vehicle may travel based on the updated path, to move from the first parking location to the second parking location.

During specific implementation, in multi-level parking locations indicated by a topological relationship, a quantity of upstream parking locations and/or a quantity of downstream parking locations of one parking location may not be limited to one, and correspondingly, a parking location queue to which the parking location belongs may not be limited to one. Therefore, when performing, based on the topological relationship, parking location resource scheduling for a plurality of vehicles that compete for a same parking location or parking location queue, the parking location resource management module needs to follow specified guidance rule information, for example, preferentially allocating the parking location or parking location queue to a vehicle that arrives first or a vehicle with a higher task priority.

Figure 8:
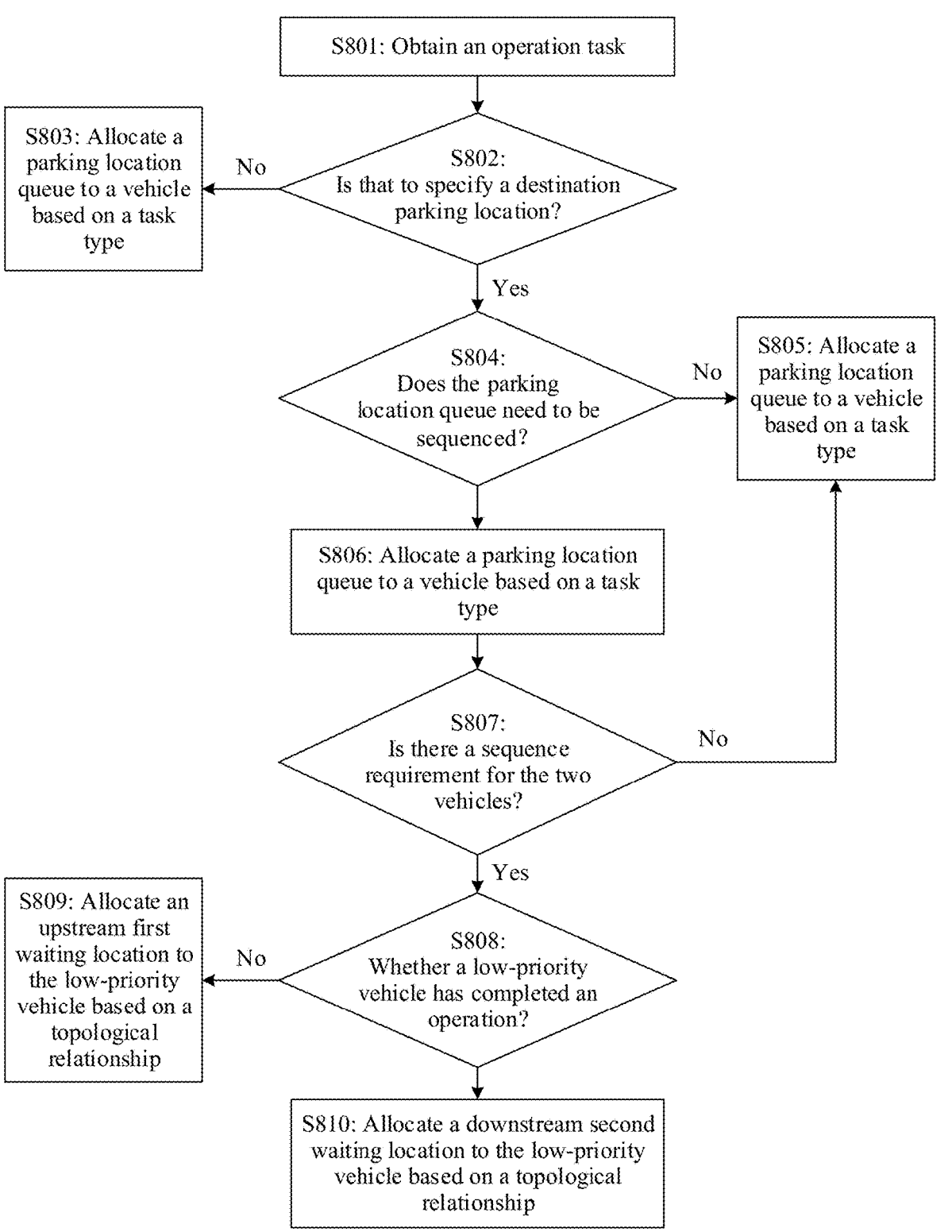
FIG. 8 is a schematic flowchart of a vehicle control method according to an embodiment of this application.

FIG. 8 is a schematic diagram of a parking location resource scheduling procedure to which an embodiment of this application is applicable. Refer to FIG. 8. When performing parking location resource scheduling for the vehicle based on the specified guidance rule information in S710, the parking location resource management module may allocate the second parking location to the target vehicle based on parking location attribute information and/or parking location queue attribute information in the topological relationship. The following steps may be specifically included.

S801: The parking location resource management module obtains an operation task of the vehicle.

S802: The parking location resource management module determines whether the operation task is a task of a specified destination parking location. If the operation task is not the task of the specified destination parking location, S803 is performed. Alternatively, if the operation task is the task of the specified destination parking location, S804 is performed.

S803: The parking location resource management module allocates an available parking location queue to the vehicle based on a task type, where "available" indicates that there is an idle parking location in the parking location queue, and the parking location queue may be allocated to the vehicle, so that the vehicle travels to the idle parking location in the parking location queue.

S804: The parking location resource management module determines whether a vehicle sequencing attribute of a parking location queue to which the destination parking location belongs is true. If the vehicle sequencing attribute of the parking location queue to which the destination parking location belongs is not true, S805 is performed. Alternatively, if the vehicle sequencing attribute of the parking location queue to which the destination parking location belongs is true, S806 is performed.

S805: The parking location resource management module allocates a parking location resource to the vehicle based on a first-come first-served rule.

S806: The parking location resource management module queries a task priority of the vehicle.

S807: The parking location resource management module determines whether there is a constraint on a completion sequence of the vehicle and another vehicle. If there is no constraint on the completion sequence of the vehicle and the another vehicle, S805 is performed. Alternatively, if there is a constraint on the completion sequence of the vehicle and the another vehicle, S808 is performed. The constraint on the completion sequence is an operation sequence that needs to be followed by the vehicle when the vehicle completes a corresponding service task, for example, a packing sequence in a port scenario.

S808: The parking location resource management module determines whether a vehicle with a lower task priority has completed an operation. If the vehicle with the lower task priority has not completed the operation, S809 is performed. Alternatively, if the vehicle with the lower task priority has completed the operation, S810 is performed. In a commercial vehicle production environment, the task priority may be a priority configured for the vehicle when a task is delivered. In a passenger vehicle environment, the task priority may be determined by a vehicle type. For example, a task priority of a special operation vehicle (for example, an engineering emergency vehicle or an ambulance vehicle) is higher than a task priority of a common vehicle (for example, a privately owned vehicle, an operation bus, or a truck).

S809: The parking location resource management module allocates an upstream first waiting location to a low-priority vehicle based on the topological relationship, so that the low-priority vehicle is temporarily parked at the first waiting location, and waits for a high-priority vehicle to first move to a working location and execute an operation task.

S810: The parking location resource management module allocates a downstream second waiting location to the low-priority vehicle based on the topological relationship, so that the low-priority vehicle is temporarily parked at the second waiting location after moving away from the working location, and after the high-priority vehicle completes the operation and moves away from a parking location queue, the low-priority vehicle moves away from the parking location queue.

Thus, according to the flowcharts shown in FIG. 7A and FIG. 7B and FIG. 8, when a plurality of vehicles compete for a same parking location and the parking location resource management module needs to perform parking location resource scheduling, the parking location resource management module determines, with reference to destination information of each vehicle, arrival time, a target parking location queue sequencing attribute, a task priority of the vehicle, and the like, a target vehicle for which parking location resource scheduling needs to be performed first. For example, the target vehicle may be the only vehicle in a plurality of upstream parking locations of the to-be-competed parking location, a vehicle with a highest task priority, or a vehicle that first arrives in a plurality of vehicles with a same task priority. In addition, the parking location resource management module may guide the target vehicle, to perform queue sequencing on another vehicle or allocate a temporary parking location to another vehicle. In this way, it can be ensured that the plurality of vehicles operate in a cooperative and orderly manner, congestion is reduced, and overall operation efficiency of a vehicle platoon is improved.

When the foregoing solution is applied to the commercial vehicle production environment, all vehicles in the vehicle platoon can be helped to travel in an orderly manner and complete a task, to improve overall operation efficiency of the vehicle platoon. When the foregoing solution is applied to the passenger vehicle environment, in a scenario in which a plurality of vehicles need to queue to compete for a same parking location, for example, in a toll station scenario, the vehicles pay fees at a toll station gate and enter and exit in a queuing manner, or in a road junction scenario, the vehicles pass through a same road junction in a queuing and orderly manner, parking location resource scheduling is performed for the plurality of vehicles, so that the plurality of vehicles may pass in an orderly manner in a short time, to reduce problems such as queuing waiting and circling of some vehicles as much as possible, improve overall efficiency of the vehicle platoon, and improve user experience.

In addition, in the commercial vehicle production environment like a port, a requirement on space utilization is high. To maximize economic benefits of the port, as much space as possible is required for placing a container. Therefore, space that can be used for parking is small. In addition, no dedicated parking lot is set up at the port. Instead, a vehicle that is not used temporarily is parked on a lane that is not used temporarily. When a vehicle is parked on a lane, a heading angle of the vehicle needs be consistent with an allowed driving direction of the lane. When each vehicle can freely enter and exit, a distance between two adjacent vehicles needs to be long enough. However, in this mode, large space is required to park the vehicle, and parking locations may be insufficient.

In this embodiment of this application, a compact parking location queue shown in FIG. 5 is designed. In the compact parking location queue, a spacing between any two adjacent parking locations is small, and the compact parking location queue may be used to park vehicles in a dense manner for a long time, to improve space utilization. In addition, corresponding guidance rule information is set for the compact vehicle, so that when a vehicle is allocated, based on the guidance rule information, to a parking location in the compact parking location queue for parking, the vehicle can be parked in an orderly manner and it is convenient for the vehicle to enter and exit.

In an example, when parking location resource scheduling is performed for a plurality of vehicles, the parking location resource management module may determine a sequence in which the plurality of vehicles arrive at a destination, and then determine a parking sequence of the plurality of vehicles based on the sequence in which the plurality of vehicles arrive at the destination. In another example, the parking location resource management module may determine, for example, a parking sequence of a plurality of vehicles based on a travel task.

Figure 9:
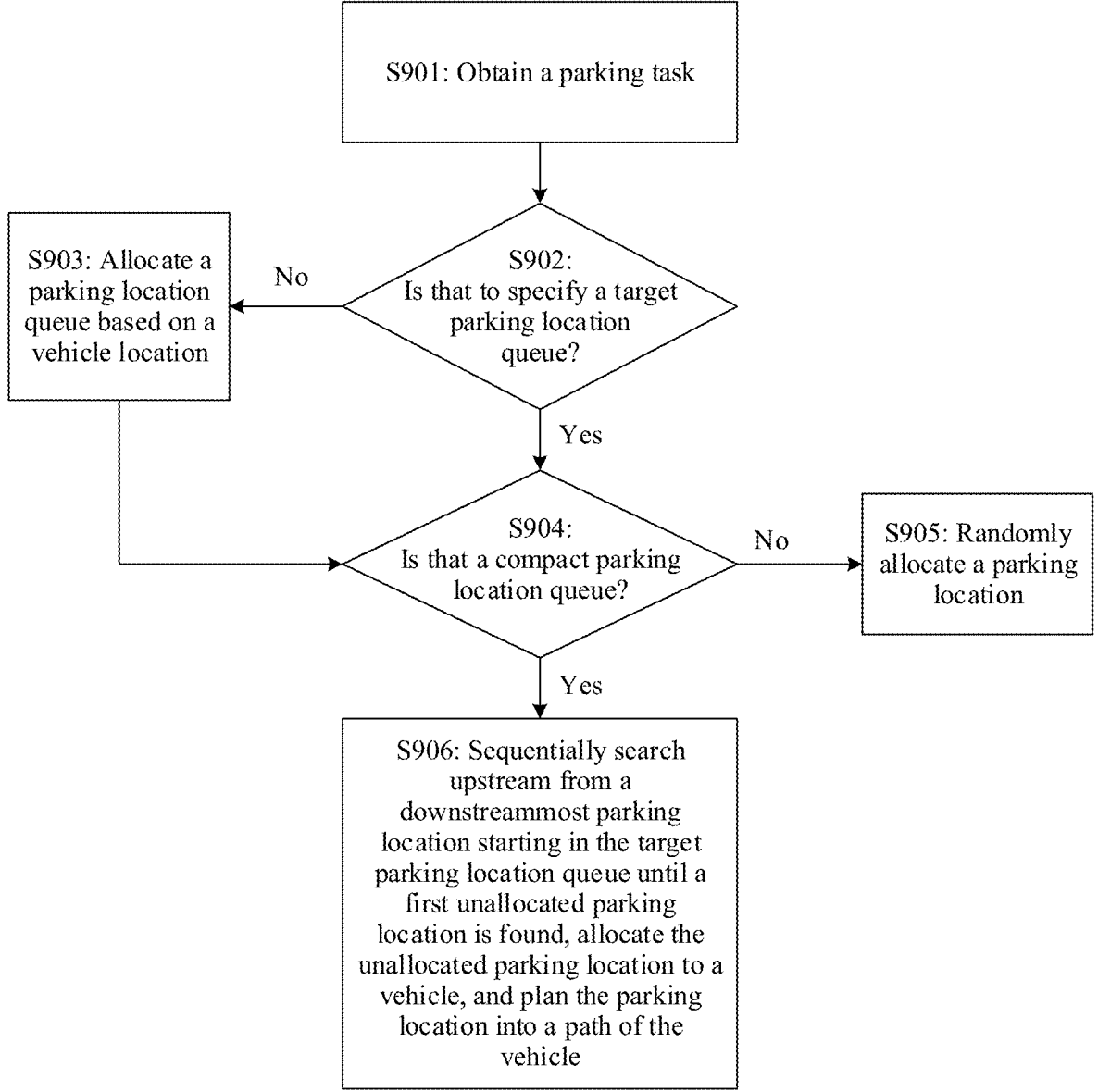
FIG. 9 is a schematic flowchart of a vehicle control method according to an embodiment of this application.

The compact parking location queue shown in FIG. 5 is used as an example. An arrow direction from left to right represents a direction from upstream to downstream on a lane. Parking locations are sequentially L4, L3, L2, and L1. There is an upstream and downstream topological relationship between two adjacent parking locations, and the upstream and downstream topological relationship is consistent with the direction from upstream to downstream on the lane. A spacing between the two adjacent parking locations is small, if a vehicle is parked in a downstream parking location, a vehicle in an upstream parking location cannot move. Therefore, when a parking location is allocated to a vehicle based on the compact parking location queue, a vehicle that first completes a task needs to be preferentially parked, or a vehicle that needs to preferentially travel needs to be preferentially parked. Refer to the flowchart shown in FIG. 9. When the parking location resource management module needs to perform parking location resource scheduling for the vehicle in S710, the vehicle control method may include the following steps.

S901: The parking location resource management module obtains a parking task of the vehicle.

S902: The parking location resource management module determines whether the parking task is a task for which a target parking location queue is specified. If the parking task is not the task for which the target parking location queue is specified, S903 is performed. Alternatively, if the parking task is the task for which the target parking location queue is specified, S904 is performed.

S903: The parking location resource management module allocates a parking location queue to the vehicle based on a vehicle location.

S904: The parking location resource management module determines whether the target parking location queue is a compact parking location queue. If the target parking location queue is not the compact parking location queue, S905 is performed. Alternatively, if the target parking location queue is the compact parking location queue, S906 is performed.

S905: Randomly allocate an available parking location.

S906: Sequentially search upstream from a downstream-most parking location starting in the target parking location queue until a first unallocated parking location is found, allocate the unallocated parking location to the vehicle, and plan the parking location into a path of the vehicle.

Figure 10:
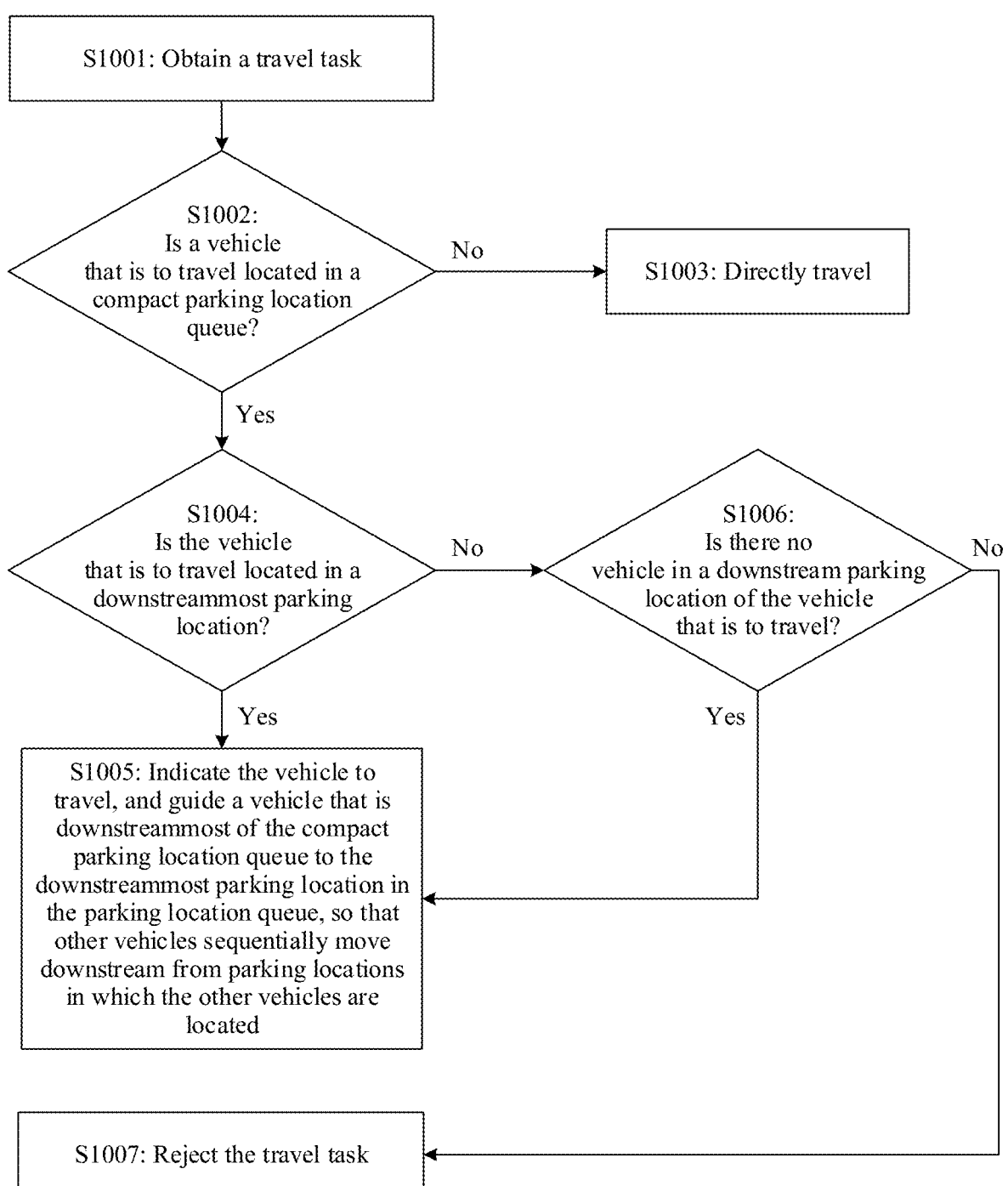
FIG. 10 is a schematic flowchart of a vehicle control method according to an embodiment of this application.

In another example, when traveling, a vehicle parked in the compact parking location queue also needs to follow a travel guidance rule of the compact parking location queue. Refer to FIG. 10. The following steps may be included.

S1001: A parking location resource management module obtains a travel task, where the travel task indicates a vehicle that is to travel.

S1002: The parking location resource management module determines whether the vehicle that is to travel is located in a compact parking location queue. If the vehicle that is to travel is not located in the compact parking location queue, S1003 is performed. Alternatively, if the vehicle that is to travel is located in the compact parking location queue, S1004 is performed.

S1003: The parking location resource management module indicates, based on the travel task, the vehicle to directly travel.

S1004: The parking location resource management module determines whether the vehicle that is to travel is located in a downstreammost parking location of the compact parking location queue. If the vehicle that is to travel is located in the downstreammost parking location of the compact parking location queue, S1005 is performed. Alternatively, if the vehicle that is to travel is not located in the downstream-most parking location of the compact parking location queue, S1006 is performed.

S1005: The parking location resource management module indicates the vehicle to travel, and guides a vehicle that is downstreammost of the compact parking location queue to the downstreammost parking location in the parking location queue, and other vehicles sequentially move downstream from parking locations in which the other vehicles are located.

S1006: The parking location resource management module determines whether there is no vehicle in a downstream parking location of the vehicle that is to travel. If there is no vehicle in the downstream parking location of the vehicle that is to travel, S1005 is performed. Alternatively, if there is a vehicle in the downstream parking location of the vehicle that is to travel, S1007 is performed.

S1007: The parking location resource management module rejects the travel task.

Therefore, according to the foregoing solution, a compact parking location queue is designed for parking a vehicle, so that space utilization of a target zone can be improved. In addition, guidance rule information is set for the compact parking location queue, so that when parking location resource scheduling is performed for vehicles based on the compact parking location queue, a parking sequence and a travel sequence of different vehicles in the compact parking location queue can be properly planned through parking location resource scheduling. This ensures orderly entry and exit of the vehicles, facilitates orderly movement of a plurality of vehicles and completes a related operation task, and ensures overall operation efficiency of the plurality of vehicles.

In addition, in various types of parking locations, generally, only a parking location can be used to park a vehicle for a long time, and a working location for performing an operation or a waiting location for a vehicle to temporarily wait for an operation is used to park a vehicle in a short time. When a vehicle completes an operation, the vehicle needs to immediately move away from a related parking location. Therefore, in this embodiment of this application, to reduce a case in which a vehicle stays in a parking location for a long time (for example, due to a task distribution system or a network delay problem, the vehicle does not receive a next task when a current task is completed, and consequently the vehicle stays in the parking location for an excessively long time), and normal working of another vehicle is affected, in this embodiment of this application, optionally, when parking location information is set, corresponding stay duration, for example, a first threshold, may be set for the parking location. The stay duration may be a maximum value of duration in which the vehicle is allowed to stay in the parking location. When the stay duration of the vehicle in the parking location reaches (or is about to reach) the stay duration, the vehicle needs to move away from the parking location. In this case, the vehicle control apparatus 110 may perform parking location resource scheduling for the vehicle, and determine a next parking location to which the vehicle moves.

Figure 11:
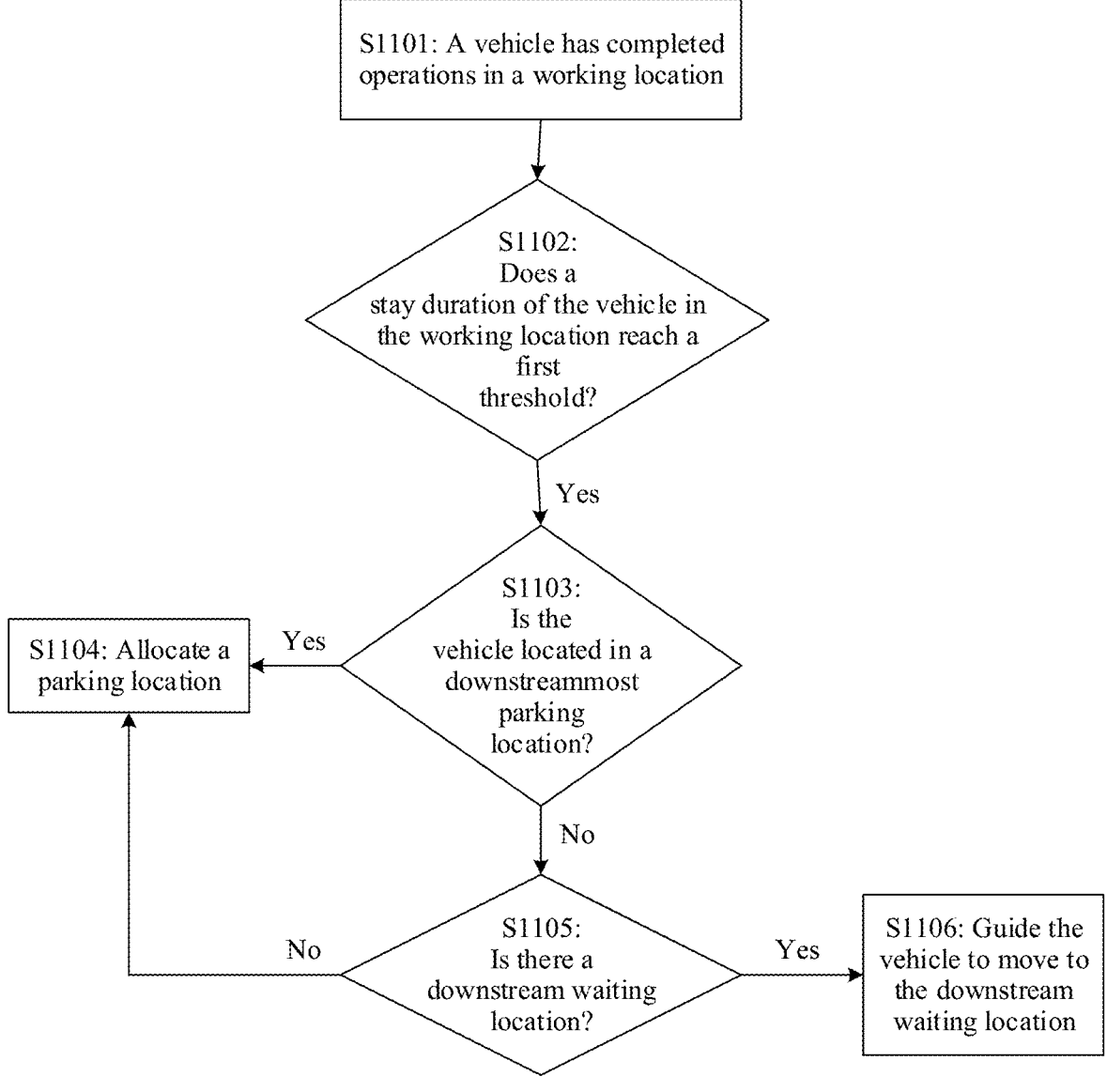
FIG. 11 is a schematic flowchart of a vehicle control method according to an embodiment of this application.

Refer to FIG. 11. A vehicle located in a working location is used as an example. When the parking location resource management module needs to perform parking location resource scheduling for the vehicle in S710, the vehicle control method may include the following steps.

S1101: The parking location resource management module determines that the vehicle has completed operations in the working location.

S1102: The parking location resource management module determines whether stay duration of the vehicle in the working location reaches a first threshold. If the stay duration of the vehicle in the working location reaches the first threshold, S1103 is performed. Alternatively, if the stay duration of the vehicle in the working location does not reach the first threshold, continue to determine until the stay duration of the vehicle in the working location reaches the first threshold, or a new task is received before the first threshold is reached.

S1103: The parking location resource management module determines whether the vehicle is located in a down-streammost parking location of a corresponding parking location queue. If the vehicle is located in the downstream-most parking location of the corresponding parking location queue, S1104 is performed. Alternatively, if the vehicle is not located in the downstreammost parking location of the corresponding parking location queue, S1105 is performed.

S1104: The parking location resource management module allocates a parking location to the vehicle.

S1105: The parking location resource management module determines whether a waiting location exists down-stream of the working location of the vehicle. If the waiting location exists downstream of the working location of the vehicle, S1106 is performed. Alternatively, if the waiting location does not exist downstream of the working location of the vehicle, S1104 is performed.

S1106: The parking location resource management module guides the vehicle to move to a downstream waiting location of the working location.

Therefore, in the foregoing solution, stay duration is set for a predefined parking location, and the vehicle is guided to move based on the stay duration, to reduce a probability that movement or work of another vehicle is affected because the vehicle stays in a same parking location for a long time. This helps improve overall operation efficiency of a plurality of vehicles. In addition, the vehicle control apparatus 110 may automatically detect an exception and resolve an exception problem, to greatly reduce a burden of an operator, and reduce an efficiency problem caused by untimely scheduling of the operator as much as possible.

Based on a same technical concept, an embodiment of this application further provides a vehicle control apparatus, configured to perform the method performed by the vehicle control apparatus in the foregoing method embodiments. For related features, refer to the foregoing method embodiments. Details are not described herein again.

Figure 12:
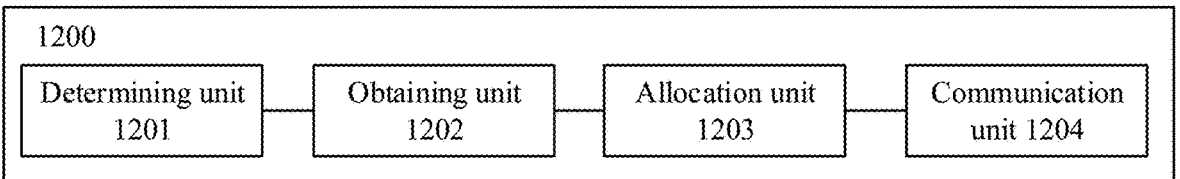
FIG. 12 is a schematic diagram of a structure of a vehicle control apparatus according to an embodiment of this application.

As shown in FIG. 12, the vehicle control apparatus 1200 may include: a determining unit 1201, configured to determine a target vehicle, where the target vehicle is located in a first parking location; an obtaining unit 1202, configured to obtain a topological relationship, where the topological relationship indicates an association relationship between multi-level parking locations, the multi-level parking locations include a first-level parking location and a second-level parking location, the first-level parking location includes the first parking location, and the second-level parking location includes at least one downstream parking location of the first parking location; an allocation unit 1203, configured to allocate a second parking location to the target vehicle based on the topological relationship, where the second parking location is an idle parking location in the second-level parking location; and a communication unit 1204, configured to indicate the target vehicle to move from the first parking location to the second parking location.

Optionally, the first-level parking location includes a plurality of parking locations, and the target vehicle is the only vehicle in the plurality of parking locations, or a vehicle with a highest task priority, or a vehicle that first arrives in a plurality of vehicles with a same task priority.

Optionally, the multi-level parking location includes a third-level parking location, the third-level parking location includes at least one upstream parking location of the first-level parking location, and the target vehicle is a vehicle with a highest task priority in the first-level parking location and the at least one upstream parking location of the first-level parking location.

Optionally, the obtaining unit is configured to obtain destination information of a plurality of vehicles, where the destination information of the plurality of vehicles indicates a same destination. The determining unit is configured to determine the target vehicle from the plurality of vehicles.

Optionally, the determining unit is further configured to: determine a sequence in which the plurality of vehicles arrive at the destination; and determine a parking sequence of the plurality of vehicles based on the sequence in which the plurality of vehicles arrive at the destination.

Optionally, the determining unit is further configured to determine the parking sequence of the plurality of vehicles based on a travel task.

Optionally, the obtaining unit is configured to obtain status information of the plurality of vehicles. The determining unit is configured to determine the target vehicle based on the status information of the plurality of vehicles.

Optionally, the obtaining unit is configured to obtain parking location attribute information in the topological relationship. The allocation unit is configured to allocate the second parking location to the target vehicle based on the parking location attribute information.

Optionally, the communication unit is configured to: when stay duration of the target vehicle in the first parking location is greater than or equal to a first threshold, indicate the target vehicle to move from the first parking location to the second parking location.

An embodiment of this application further provides a vehicle control apparatus, configured to perform the method performed by the vehicle in the foregoing method embodiments. For related features, refer to the foregoing method embodiments. Details are not described herein again.

Figure 13:
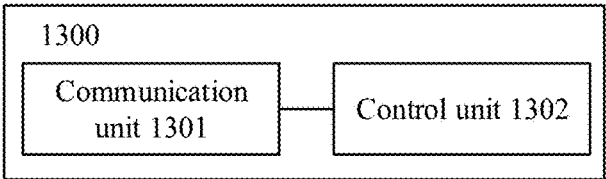
FIG. 13 is a schematic diagram of a structure of a vehicle according to an embodiment of this application.

As shown in FIG. 13, the apparatus 1300 may include: a communication unit 1301, configured to receive first indication information, where a target vehicle is located in a first parking location, the first parking location and a second parking location are parking locations defined in a same topological relationship, the topological relationship indicates an association relationship between multi-level parking locations, the multi-level parking locations include a first-level parking location and a second-level parking location, the first-level parking location includes the first parking location, and the second-level parking location includes at least one downstream parking location of the first parking location; and a control unit 1302, configured to control, based on the first indication information, the vehicle to move from the first parking location to the second parking location.

Optionally, the communication unit is further configured to report destination information, where the destination information indicates a destination of the target vehicle.

Optionally, the communication unit is further configured to report status information, where the status information includes at least one of the following: a location, a speed, and a heading angle.

Optionally, the communication unit is further configured to receive second indication information, where the second indication information indicates stay duration in the first parking location.

An embodiment of this application further provides a vehicle control apparatus, configured to perform the method performed by the vehicle in the foregoing method embodiments. For related features, refer to the foregoing method embodiments. Details are not described herein again. For example, the vehicle control apparatus may include: an obtaining unit, configured to obtain map information of a target zone, where the map information includes a plurality of pieces of parking location attribute information; and a planning unit, configured to determine a running route of the target vehicle based on the plurality of pieces of parking location attribute information.

It should be noted that, in this embodiment of this application, division into units is an example, and is merely logical function division. In actual implementation, another division manner may be used. Function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes several instructions for instructing a computer device (which may be a personal computer, a server, or a network device) or a processor (processor) to perform all or some of the steps of the methods described in embodiments of this application. The storage medium includes any medium that can store program code, like a USB flash drive, a removable hard disk, a read-only memory (ROM, Read-Only Memory), a random access memory (RAM, Random Access Memory), a magnetic disk, or an optical disc.

Figure 14:
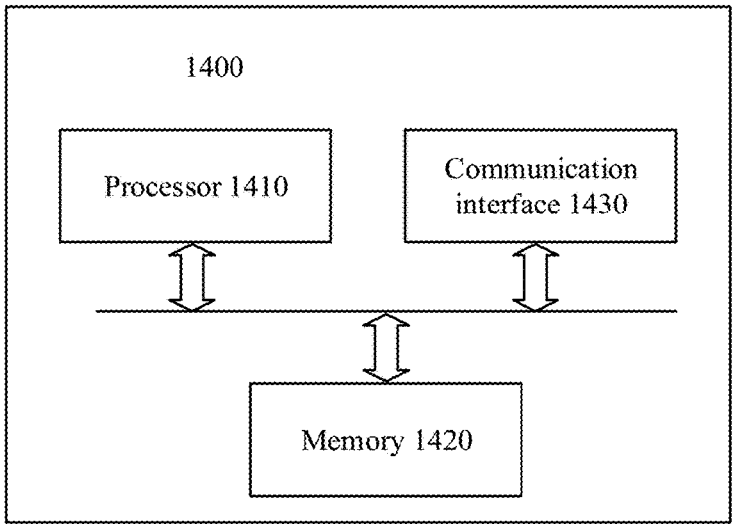
FIG. 14 is a schematic diagram of a structure of an apparatus according to an embodiment of this application.

In a simple embodiment, a person skilled in the art may figure out that the vehicle control apparatus or the vehicle in the foregoing embodiments may use a form shown in FIG. 14.

An apparatus 1400 shown in FIG. 14 includes at least one processor 1410 and a memory 1420, and optionally, may further include a communication interface 1430.

The memory 1420 may be a volatile memory, for example, a random access memory. Alternatively, the memory may be a non-volatile memory, for example, a read-only memory, a flash memory, a hard disk drive (hard disk drive, HDD), or a solid-state drive (solid-state drive, SSD). Alternatively, the memory 1420 is any other medium that can be used to carry or store expected program code in an instruction or data structure form and that can be accessed by a computer. However, this is not limited thereto. The memory 1420 may be a combination of the foregoing memories.

In this embodiment of this application, a specific connection medium between the processor 1410 and the memory 1420 is not limited.

The apparatus shown in FIG. 14 further includes the communication interface 1430, and when communicating with another device, the processor 1410 may transmit data through the communication interface 1430.

When a vehicle control apparatus uses a form shown in FIG. 14, the processor 1410 in FIG. 14 may invoke computer executable instructions stored in the memory 1420, so that the apparatus 1400 can perform the method performed by the vehicle control apparatus in any one of the foregoing method embodiments.

When a vehicle uses a form shown in FIG. 14, the processor 1410 in FIG. 14 may invoke computer executable instructions stored in the memory 1420, so that the apparatus 1400 can perform the method performed by the vehicle in any one of the foregoing method embodiments.

An embodiment of this application further relates to a chip system. The chip system includes a processor, configured to invoke a computer program or computer instructions stored in a memory, so that the processor performs the method in any one of embodiments shown in FIG. 2 or FIG. 7A to FIG. 11.

In a possible implementation, the processor is coupled to the memory through an interface.

In a possible implementation, the chip system further includes a memory, and the memory stores a computer program or computer instructions.

An embodiment of this application further relates to a processor. The processor is configured to invoke a computer program or computer instructions stored in a memory, so that the processor performs the method according to any one of embodiments shown in FIG. 2 or FIG. 7A to FIG. 11.

The processor mentioned in any one of the foregoing descriptions may be a general-purpose central processing unit, a microprocessor, an application-specific integrated circuit (application-specific integrated circuit, ASIC), or one or more integrated circuits configured to control program execution of the driving scenario recognition method in the embodiment shown in FIG. 5. The memory mentioned in any one of the foregoing descriptions may be a read-only memory (read-only memory, ROM), another type of static storage device that can store static information and instructions, a random access memory (random access memory, RAM), or the like.

It should be understood that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, a CD-ROM, an optical memory, and the like) that include computer-usable program code.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of this application without departing from the scope of embodiments of this application. In this way, this application is intended to cover these modifications and variations of embodiments of this application provided that they fall within the scope of protection defined by the following claims and their equivalent technologies.

What is claimed is:

1. A method, where the method comprising:
   determining a target vehicle, wherein the target vehicle is located in a first parking location of a first-level parking location, the first-level parking location comprises a plurality of parking locations that comprise the first parking location, and the target vehicle is a vehicle with a highest task priority in the first-level parking location, or a vehicle that first arrives among a plurality of vehicles with a same task priority in the first-level parking location; and
   instructing the target vehicle to move from the first parking location to a second parking location based on a topological relationship, wherein the topological relationship indicates an association relationship between multi-level parking locations, the multi-level parking locations comprise the first-level parking location and a second-level parking location, and the second-level parking location comprises at least one downstream parking location of the first parking location and the second parking location is an idle parking location in the second-level parking location.

2. The method according to claim 1, wherein the method further comprises:
   obtaining the topological relationship; and allocating the second parking location to the target vehicle based on the topological relationship.

3. The method according to claim 1, wherein the method comprises:

obtaining a respective task priority of each of the plurality of vehicles; and determining the target vehicle based on the respective task priority of each of the plurality of vehicles.

4. The method according to claim 1, wherein the multi-level parking locations comprise a third-level parking location, the third-level parking location comprises at least one upstream parking location of the first-level parking location.

5. The method according to claim 1, wherein the determining the target vehicle comprises:

obtaining destination information of the plurality of vehicles, wherein the destination information of the plurality of vehicles indicates a same destination; and determining the target vehicle from the plurality of vehicles.

6. The method according to claim 5, wherein the method further comprises:

determining a sequence in which the plurality of vehicles arrive at the same destination; and determining a parking sequence of the plurality of vehicles based on the sequence in which the plurality of vehicles arrive at the same destination.

7. A method, where the method comprises:

receiving, by a target vehicle, first indication information, wherein the target vehicle is located in a first parking location of a first-level parking location, the first-level parking location comprises a plurality of parking locations that comprise the first parking location, the target vehicle is a vehicle with a highest task priority in the first-level parking location, or a vehicle that first arrives among a plurality of vehicles with a same task priority in the first-level parking location, the first indication information instructs the target vehicle to move from the first parking location to a second parking location, the first parking location and the second parking location are parking locations defined in a topological relationship, the topological relationship indicates an association relationship between multi-level parking locations, the multi-level parking locations comprise the first-level parking location and a second-level parking location, and the second-level parking location comprises at least one downstream parking location of the first parking location; and moving, by the target vehicle, from the first parking location to the second parking location based on the first indication information.

8. The method according to claim 7, wherein the target vehicle is an only vehicle in the plurality of parking locations.

9. The method according to claim 7, wherein the multi-level parking locations comprise a third-level parking location, the third-level parking location comprises at least one upstream parking location of the first-level parking location.

10. The method according to claim 7, wherein the method further comprises:

reporting, by the target vehicle, destination information, wherein the destination information indicates a destination of the target vehicle.

11. The method according to claim 7, wherein the method further comprises:

reporting, by the target vehicle, status information, wherein the status information comprises at least one of the following: a location, a speed, or a heading angle.

12. The method according to claim 7, wherein the method further comprises:

receiving, by the target vehicle, second indication information, wherein the second indication information indicates a stay duration in the first parking location.

13. An apparatus, comprising:

at least one processor; and one or more memories coupled to the at least one processor and storing programming instructions for execution by the at least one processor to cause the apparatus to:

determine a target vehicle, wherein the target vehicle is located in a first parking location of a first-level parking location, the first-level parking location comprises a plurality of parking locations that comprise the first parking location, and the target vehicle is a vehicle with a highest task priority in the first-level parking location, or a vehicle that first arrives among a plurality of vehicles with a same task priority in the first-level parking location; and instruct the target vehicle to move from the first parking location to a second parking location based on a topological relationship, wherein the topological relationship indicates an association relationship between multi-level parking locations, the multi-level parking locations comprise the first-level parking location and a second-level parking location, and the second-level parking location comprises at least one downstream parking location of the first parking location and the second parking location is an idle parking location in the second-level parking location.

14. The apparatus according to claim 13, wherein the programming instructions, when executed by the at least one processor, cause the apparatus to:

obtain the topological relationship; and allocate the second parking location to the target vehicle based on the topological relationship.

15. The apparatus according to claim 13, wherein the programming instructions, when executed by the at least one processor, cause the apparatus to:

obtain a respective task priority of each of the plurality of vehicles; and determine the target vehicle based on the respective task priority of each of the plurality of vehicles.

16. The apparatus according to claim 13, wherein the multi-level parking locations comprise a third-level parking location, the third-level parking location comprises at least one upstream parking location of the first-level parking location.

17. The apparatus according to claim 13, wherein the programming instructions, when executed by the at least one processor, cause the apparatus to:

obtain destination information of the plurality of vehicles, wherein the destination information of the plurality of vehicles indicates a same destination; and determine the target vehicle from the plurality of vehicles.

18. The apparatus according to claim 17, wherein the programming instructions, when executed by the at least one processor, cause the apparatus to:

determine a sequence in which the plurality of vehicles arrive at the same destination; and determine a parking sequence of the plurality of vehicles based on the sequence in which the plurality of vehicles arrive at the same destination.

19. The apparatus according to claim 18, wherein the programming instructions, when executed by the at least one processor, cause the apparatus to:

determine the parking sequence of the plurality of vehicles based on a travel task.

20. The apparatus according to claim 13, wherein the programming instructions, when executed by the at least one processor, cause the apparatus to:

obtain status information of the plurality of vehicles; and
determine the target vehicle based on the status information of the plurality of vehicles.

21. The apparatus according to claim 20, wherein the status information of the plurality of vehicles comprises at least one of the following: a location, a speed, or a heading angle.

22. The apparatus according to claim 13, wherein the topological relationship comprises parking location attribute information and the programming instructions, when executed by the at least one processor, cause the apparatus to:

allocate the second parking location to the target vehicle based on the parking location attribute information.

23. The apparatus according to claim 22, wherein the parking location attribute information comprises at least one of a type of a parking location or an availability status of the parking location.

24. The apparatus according to claim 13, wherein the programming instructions, when executed by the at least one processor, cause the apparatus to:

when a stay duration of the target vehicle in the first parking location is greater than or equal to a first threshold, instruct the target vehicle to move from the first parking location to the second parking location.

25. An apparatus, comprising:

at least one processor; and one or more memories coupled to the at least one processor and storing programming instructions for execution by the at least one processor to cause the apparatus to:

receive first indication information, wherein a target vehicle is located in a first parking location of a first-level parking location, the first-level parking location comprises a plurality of parking locations that comprise the first parking location, and the target vehicle is a vehicle with a highest task priority in the first-level parking location, or a vehicle that first arrives among a plurality of vehicles with a same task priority in the first-level parking location, the first indication information instructs the target vehicle to move from the first parking location to a second parking location, the first parking location and the second parking location are parking locations defined in a topological relationship, the topological relationship indicates an association relationship between multi-level parking locations, the multi-level parking locations comprise the first-level parking location and a second-level parking location, and the second-level parking location comprises at least one downstream parking location of the first parking location; and control the target vehicle to move from the first parking location to the second parking location based on the first indication information.

26. The apparatus according to claim 25, wherein the target vehicle is an only vehicle in the plurality of parking locations.

27. The apparatus according to claim 25, wherein the multi-level parking locations comprise a third-level parking location, the third-level parking location comprises at least one upstream parking location of the first-level parking location.

28. The apparatus according to claim 25, wherein the programming instructions, when executed by the at least one processor, cause the apparatus to:

report destination information, wherein the destination information indicates a destination of the target vehicle.

29. The apparatus according to claim 25, wherein the programming instructions, when executed by the at least one processor, cause the apparatus to:

report status information, wherein the status information comprises at least one of the following information: a location, a speed, or a heading angle.

30. The apparatus according to claim 25, wherein the programming instructions, when executed by the at least one processor, cause the apparatus to:

receive second indication information, wherein the second indication information indicates a stay duration in the first parking location.

\* \* \* \* \*